(12) United States Patent
Jaganathan et al.

(10) Patent No.: US 10,171,151 B1
(45) Date of Patent: Jan. 1, 2019

(54) THROUGHPUT OPTIMIZATION BY GUARD INTERVAL SELECTION FROM BEAMFORMING FEEDBACK

(71) Applicant: QUALCOMM Incorporated, San Diego, CA (US)

(72) Inventors: Madhan Jaganathan, Cupertino, CA (US); Xiaoxin Zhang, Sunnyvale, CA (US); Ahmed Ragab Elsherif, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/640,184

(22) Filed: Jun. 30, 2017

(51) Int. Cl.
| | | |
|---|---|---|
| *H04B 1/59* | (2006.01) | |
| *H04B 7/06* | (2006.01) | |
| *H04B 7/0417* | (2017.01) | |
| *H04B 7/0456* | (2017.01) | |
| *H04L 27/26* | (2006.01) | |

(52) U.S. Cl.
CPC ............ *H04B 7/0617* (2013.01); *H04B 1/59* (2013.01); *H04B 7/0417* (2013.01); *H04B 7/0469* (2013.01); *H04B 7/0621* (2013.01); *H04B 7/0641* (2013.01); *H04B 7/0684* (2013.01); *H04L 27/2601* (2013.01)

(58) Field of Classification Search
CPC ...... H04B 7/0617; H04B 1/59; H04B 7/0417; H04B 7/0469; H04B 7/0621; H04B 7/0641; H04B 7/0684; H04B 27/2601
See application file for complete search history.

(56) References Cited

U.S. PATENT DOCUMENTS

| | | | |
|---|---|---|---|
| 7,602,696 B2 | 10/2009 | Rhodes | |
| 7,957,481 B2 * | 6/2011 | Nilsbo | H04L 25/022 375/260 |
| 8,121,206 B2 | 2/2012 | Lee et al. | |
| 8,121,231 B2 | 2/2012 | Jonsson | |
| 2014/0192847 A1 | 7/2014 | Afkhami et al. | |
| 2014/0355626 A1 | 12/2014 | Fechtel | |
| 2015/0334708 A1 | 11/2015 | Lee et al. | |

(Continued)

OTHER PUBLICATIONS

International Search Report and Written Opinion—PCT/US2018/029400—ISA/EPO—dated Jul. 3, 2018.

*Primary Examiner* — Janice N Tieu
(74) *Attorney, Agent, or Firm* — Holland & Hart LLP/Qualcomm

(57) ABSTRACT

This disclosure provides systems, methods and apparatus for wireless communication. In one aspect, a method of wireless communication includes utilizing a sounding procedure to obtain compressed beamforming (CBF) information. The sounding procedure may be a single-user or multi-user sounding procedure. The CBF information may contain various information regarding a particular channel that an access point may use for transmission. The information may include per-tone SNR information which may be processed to determine characteristics of the channel. Various techniques may be utilized to determine the further characteristics of the channel. The determined characteristics of the channel may then be used to determine an appropriate guard interval (GI) between symbols that are to be transmitted. Appropriate GI selection in wireless communications may facilitate higher throughput while decreasing overhead due to unnecessary idle time.

27 Claims, 16 Drawing Sheets

(56) References Cited

U.S. PATENT DOCUMENTS

| | | | |
|---|---|---|---|
| 2016/0088641 A1* | 3/2016 | Kwon | H04W 72/085 370/329 |
| 2016/0119173 A1 | 4/2016 | Zhang et al. | |
| 2016/0156750 A1 | 6/2016 | Zhang et al. | |
| 2016/0254889 A1 | 9/2016 | Shattil | |
| 2016/0301452 A1 | 10/2016 | Kwon et al. | |
| 2017/0048046 A1 | 2/2017 | Sun et al. | |

* cited by examiner

THROUGHPUT OPTIMIZATION BY GUARD INTERVAL SELECTION FROM BEAMFORMING FEEDBACK

TECHNICAL FIELD

The following relates generally to wireless communication, and more specifically to guard interval selection from beamforming feedback.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a WLAN, such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

A WLAN, such as a Wi-Fi (IEEE 802.11) network, may include an access point (AP) that communicates with one or more stations (STAs) or mobile devices. In wireless transmissions, radio frequency (RF) signals may reach a receiving antenna by two or more paths. This multipath effect may be caused by many factors. A RF signal during transmission may encounter obstacles which can alter the original signal or create new signals. One or more of the original RF signals may continue traveling straight to the receiving antenna while other signals may diffract, scatter, or reflect off the obstacles. If a later arriving symbol reaches the receiving antenna too fast, the signal may interfere with an earlier arriving symbol. A guard interval (GI) between orthogonal frequency-division multiplexing (OFDM) symbols can reduce interference from these multipath effects.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication. The apparatus can include a processor, memory in electronic communication with the processor, and instructions stored in the memory. The instructions can be operable to cause the processor to obtain compressed beamforming (CBF) information from one or more stations (STAs) as part of a sounding procedure, the CBF information including signal-to-noise ratio (SNR) information for a channel, determine a guard interval (GI) based at least in part on the SNR information for the channel, and transmit a plurality of orthogonal frequency-division multiplexing (OFDM) symbols utilizing the determined GI.

In some implementations, the instructions can be operable to cause the processor to obtain an indication of frequency variation within the per-tone SNR information using a fast Fourier transform (FFT) of the per-tone SNR information and determine a delay spread based on the indication of frequency variation within the per-tone SNR information.

In some implementations, the instructions can be operable to cause the processor to compare the determined delay spread against one or more thresholds. In some implementations, the GI can be determined based at least in part on the comparison.

In some implementations, the instructions can be operable to cause the processor to determine, for at least two tones, an absolute value of a difference between an SNR from the CBF information and an average SNR of the channel for each of the at least two tones; and calculate a mean or median of the absolute values for the at least two tones.

In some implementations, the instructions can be operable to cause the processor to compare the calculated mean or median against one or more thresholds. In some implementations, the GI can be determined based at least in part on the comparison.

In some implementations, the instructions can be operable to cause the processor to select at least one pair of tones from the CBF information; determine an absolute value of a difference between an SNR for each tone in the at least one selected pair of tones; and calculate a mean or median of the absolute values for the at least one selected pair of tones.

In some implementations, the instructions can be operable to cause the processor to compare the calculated mean or median against one or more thresholds. In some implementations, the GI can be determined based at least in part on the comparison.

In some implementations, the instructions can be operable to cause the processor to obtain a partial channel frequency response based on a compressed beamforming feedback matrix and an SNR matrix for the channel; perform an inverse fast Fourier transform (IFFT) on the obtained partial channel frequency response to obtain a time domain channel impulse response; and calculate a power of the time domain channel impulse response.

In some implementations, the instructions can be operable to cause the processor to determine a multipath delay of the channel from the calculated power and compare the determined multipath delay against one or more thresholds. In some implementations, the GI can be determined based at least in part on the comparison.

In some implementations, the instructions can be operable to cause the processor to calculate a channel impulse response power threshold to determine a first received impulse response and a last received impulse response based at least in part on a peak power, a noise power, or a combination thereof, of the calculated power. In some implementations, the determined multipath delay can be based at least in part on the determined first received impulse response and the determined last received impulse response.

In some implementations, the SNR matrix can include one or more values of the per-tone SNR information. In some implementations, the SNR matrix can include one or more average SNR values.

Another innovative aspect of the subject matter described in this disclosure can be implemented in a method for wireless communication. The method can include obtaining compressed beamforming (CBF) information from one or more stations (STAs) as part of a sounding procedure, the CBF information including signal-to-noise ratio (SNR) information for a channel, determining a guard interval (GI) based at least in part on the SNR information for the channel, and transmitting a plurality of orthogonal frequency-division multiplexing (OFDM) symbols utilizing the determined GI.

In some implementations, the method can include obtaining an indication of frequency variation within the per-tone SNR information using a fast Fourier transform (FFT) of the per-tone SNR information and determining a delay spread based on the indication of frequency variation within the per-tone SNR information.

In some implementations, the method can further include comparing the determined delay spread against one or more thresholds. In some implementations, the GI can be determined based at least in part on the comparison.

In some implementations, the method can further include determining, for at least two tones, an absolute value of a difference between an SNR from the CBF information and an average SNR of the channel for each of the at least two tones; and calculating a mean or median of the absolute values for the at least two tones.

In some implementations, the method can further include comparing the calculated mean or median against one or more thresholds. In some implementations, the GI can be determined based at least in part on the comparison.

In some implementations, the method can further include selecting at least one pair of tones from the CBF information; determining an absolute value of a difference between an SNR for each tone in the at least one selected pair of tones; and calculating a mean or median of the absolute values for the at least one selected pair of tones.

In some implementations, the method can further include comparing the calculated mean or median against one or more thresholds. In some implementations of the method, the GI can be determined based at least in part on the comparison.

In some implementations, the method can further include obtaining a partial channel frequency response based on a compressed beamforming feedback matrix and an SNR matrix for the channel; performing an inverse fast Fourier transform (IFFT) on the obtained partial channel frequency response to obtain a time domain channel impulse response; and calculating a power of the time domain channel impulse response.

In some implementations, the method can further include determining a multipath delay of the channel from the calculated power and comparing the determined multipath delay against one or more thresholds. In some implementations, the GI can be determined based at least in part on the comparison.

In some implementations, the method can further include calculating a channel impulse response power threshold to determine a first received impulse response and a last received impulse response based at least in part on a peak power, a noise power, or a combination thereof, of the calculated power. In some implementations, the determined multipath delay can be based at least in part on the determined first received impulse response and the determined last received impulse response.

In some implementations, the SNR matrix can include one or more values of the per-tone SNR information. In some implementations, the SNR matrix can include one or more average SNR values.

Another innovative aspect of the subject matter described in this disclosure can be implemented in an apparatus for wireless communication. The apparatus can include means for obtaining compressed beamforming (CBF) information from one or more stations (STAs) as part of a sounding procedure, the CBF information including signal-to-noise ratio (SNR) information for a channel, means for determining a guard interval (GI) based at least in part on the SNR information for the channel, and means for transmitting a plurality of orthogonal frequency-division multiplexing (OFDM) symbols utilizing the determined GI.

In some implementations, the apparatus can include means for obtaining an indication of frequency variation within the per-tone SNR information using a fast Fourier transform (FFT) of the per-tone SNR information; means for determining a delay spread based on the indication of frequency variation within the per-tone SNR information; and means for comparing the determined delay spread against one or more thresholds. In some implementations, the GI can be determined based at least in part on the comparison.

In some implementations, the apparatus can further include means for determining, for at least two tones, an absolute value of a difference between an SNR from the CBF information and an average SNR of the channel for each of the at least two tones; means for calculating a mean or median of the absolute values for the at least two tones; and means for comparing the calculated mean or median against one or more thresholds. In some implementations, the GI can be determined based at least in part on the comparison.

In some implementations, the apparatus can further include means for selecting at least one pair of tones from the CBF information; means for determining an absolute value of a difference between an SNR for each tone in the at least one selected pair of tones; means for calculating a mean or median of the absolute values for the at least one selected pair of tones; and means for comparing the calculated mean or median against one or more thresholds. In some implementations, the GI can be determined based at least in part on the comparison.

In some implementations, the apparatus can further include means for obtaining a partial channel frequency response based on a compressed beamforming feedback matrix and an SNR matrix for the channel; means for performing an inverse fast Fourier transform (IFFT) on the obtained partial channel frequency response to obtain a time domain channel impulse response; means for calculating a power of the time domain channel impulse response; means for determining a multipath delay of the channel from the calculated power; and means for comparing the determined multipath delay against one or more thresholds. In some implementations, the GI can be determined based at least in part on the comparison.

In some implementations, the method can further include means for calculating a channel impulse response power threshold to determine a first received impulse response and a last received impulse response based at least in part on a peak power, a noise power, or a combination thereof, of the calculated power. In some implementations, the determined multipath delay can be based at least in part on the determined first received impulse response and the determined last received impulse response.

In some implementations, the SNR matrix can include one or more values of the per-tone SNR information. In some implementations, the SNR matrix can include one or more average SNR values.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
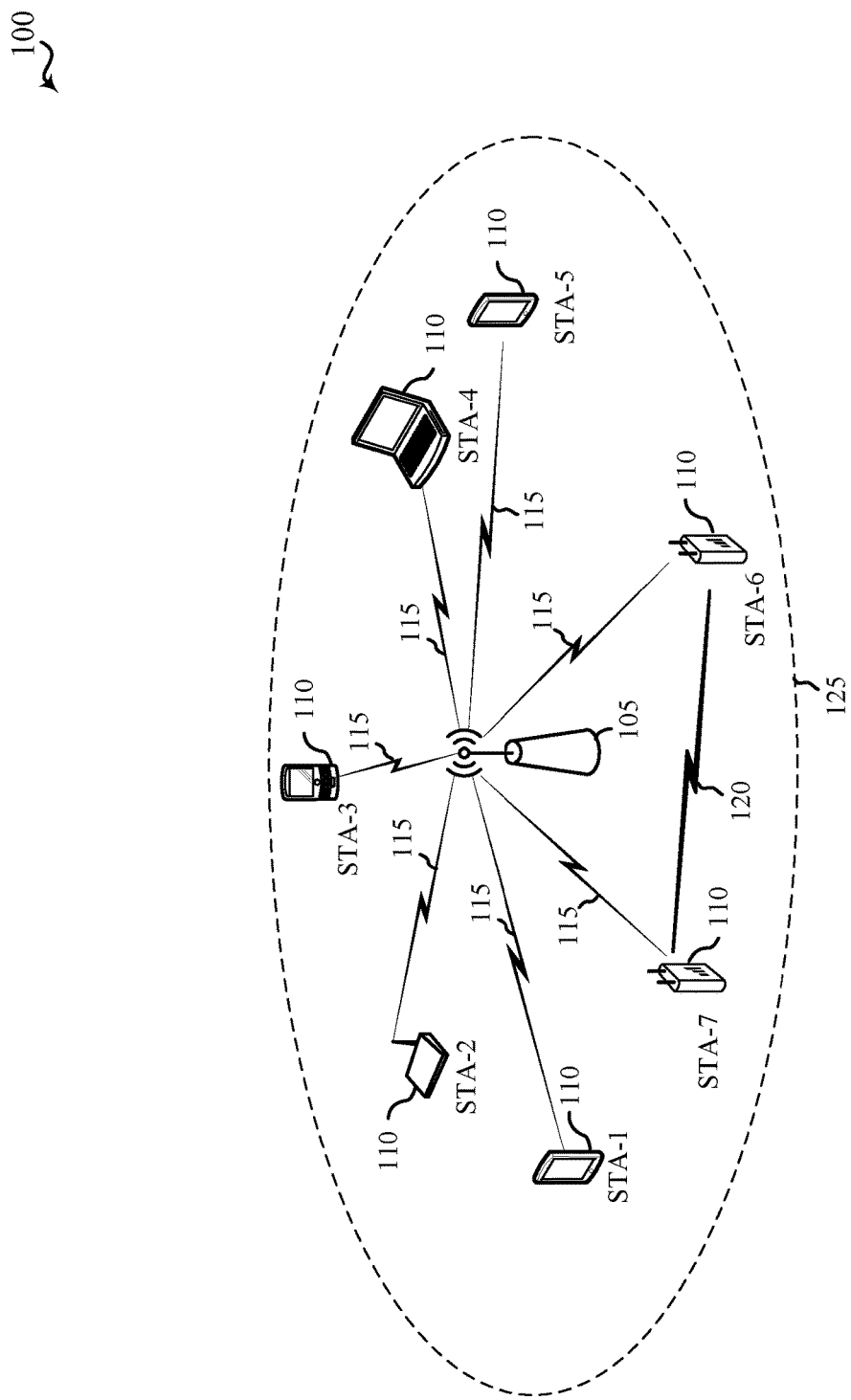
FIG. 1 shows an example wireless communication system supporting guard interval selection using compressed beamforming information.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The described techniques relate to methods, systems, devices, or apparatuses supporting guard interval (GI) using compressed beamforming information. According to the disclosed techniques, during a multi-user (MU) or single-user (SU) sounding procedure, an AP may sound a channel by transmitting null data packet announcement (NDPA) frames and null data packet (NDP) frames to the STAs. Each STA responds with a compressed beamforming (CBF) report that includes information such as channel estimates, the overall average signal-to-noise ratio (SNR), a delta of a per-tone SNR compared to the average SNR (delta SNR), etc.

The CBF report received from a STA is traditionally used for MU multiple-input multiple-output (MIMO) decisions, but the CBF report also can be used to select a guard interval for communications with the STA. Various innovative aspects of the subject matter described in this disclosure can be implemented for selecting a guard interval using the CBF report. For example, an AP may determine various characteristics of a channel from the CBF report such as a delay spread, SNR, compressed beamforming feedback matrix, etc. With these various characteristics, an AP may perform calculations in order to determine an appropriate GI for data transmissions. The appropriate GI may be chosen by comparing the various calculated values against thresholds. Multiple thresholds may be utilized if multiple GIs are supported. For example, 802.11ac may support 400 ns and 800 ns guard intervals, and 802.11ax may support 800 ns, 1.6 µs, and 3.2 µs in 802.11ax). (For products that implement both 802.11ac and 802.11ax, it is possible that all four guard interval options may be supported). With regard to the multiple thresholds, if the calculated value is below a first threshold, the resulting GI may be 400 ns. If the calculated value is between the first and a second threshold, the resulting GI may be 800 ns. If the calculated value is between the second threshold and a third threshold, the resulting (ii may be 1.6 µs. If the calculated value is above the third threshold, the resulting GI may be 3.2 µs.

Particular implementations of the subject matter described in this disclosure can be implemented to realize one or more of the following potential advantages. In using a single sounding sequence to determine the GI interval, an access point may avoid having to transmit multiple probing packets which wastes system resources. Additionally, determining the proper GI during a sounding procedure eliminates the need to wait for a transmission rate to stabilize to a specific number of spatial streams and multi-constellation signaling combination prior to using a packet probing technique. Also, implementations described in this disclosure may be used for multi-chain clients as opposed to techniques which determine GI intervals from uplink packets. This is because multi-chain devices are required to apply a cyclic shift delay of 200 ns which may cause errors to a delay spread estimation.

FIG. 1 shows an example wireless communication system supporting guard interval selection using compressed beamforming information. An example wireless local area network (WLAN) 100 includes an access point (AP) 105 and stations (STAs) 110, which are labeled as STA-1 through STA-7. The STAs 110 can be mobile handsets, tablet computers, personal digital assistants (PDAs), other handheld devices, netbooks, notebook computers, tablet computers, laptops, desktop computers, display devices (such as TVs, computer monitors, etc.), printers, etc. While one AP 105 is illustrated, the WLAN 100 can alternatively have multiple APs 105. The STAs 110 also can be referred to as mobile stations (MS), mobile devices, access terminals (ATs), user equipment (UEs), subscriber stations (SSs), or subscriber units. The STAs 110 associate and communicate with the AP 105 via communication links 115. Each AP 105 has a coverage area 125 such that the STAs 110 within that area are within range of the AP 105. The STAs 110 are dispersed throughout the coverage area 125. Each STA 110 may be stationary or mobile. Additionally, each AP 105 and STA 110 can have multiple antennas. The coverage area 125 of the AP 105 may represent a basic service area (BSA) of the WLAN 100. An extended network station (not shown) associated with the WLAN 100 may be connected to a wired or wireless distribution system that may allow multiple APs 105 to be connected in an extended service set (ESS). To facilitate guard interval selection, the AP 105 may request compressed beamforming (CBF) information from one or more STAs 110 as part of a sounding procedure. Through the use of various techniques, the AP 105 may calculate various characteristics of the channel. The AP 105 may use the calculated characteristics of the channel to determine an appropriate guard interval to use in conjunction with a future OFDM transmission.

Although not shown in FIG. 1, a STA 110 may be located in the intersection of more than one coverage area 125 and may associate with more than one AP 105. A single AP 105 and an associated set of STAs 110110 may be referred to as a BSS. An ESS is a set of connected BSSs. A distribution system (not shown) may be used to connect APs 105 in an ESS. In some cases, the coverage area 125 of an AP 105 may be divided into sectors (also not shown). The WLAN 100 may include APs 105 of different types (such as metropolitan area, home network, etc.), with varying and overlapping coverage areas 110. Two STAs 110110 also may communicate directly via a direct wireless link 120 regardless of whether both STAs 110110 are in the same coverage area 125. Examples of direct wireless links 120 may include Wi-Fi Direct connections, Wi-Fi Tunneled Direct Link Setup (TDLS) links, and other group connections. In some other implementations, peer-to-peer connections or ad hoc networks may be implemented within the WLAN 100.

The STAs 110 and the AP 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, 802.11ax, etc. Thus, the WLAN 100 implements a contention-based protocol that allows a number of devices (such as the STAs 110 and the APs 105) to share the same wireless medium (such as a channel) without pre-coordination. To prevent several devices from transmitting over the channel at the same time, each device in a BSS operates according to procedures that structure and organize medium access, thereby mitigating interference between the devices.

In the WLAN 100, the AP 105 may utilize techniques for using compressed beamforming information (such as very high throughput (VHT) compressed beamforming (CBF) report information) obtained from multiple multi-user and single-user channel sounding procedures. The AP 105 may utilize multiple-input and multiple-output (MIMO) and MU (multi-user)-MIMO communication techniques. A MIMO communication typically involves multiple transmitter antennas (such as at an AP 105) sending a signal or signals to multiple receive antennas (such as at a STA 110). Each transmitting antenna transmits independent data (or spatial) streams to increase spatial diversity and the likelihood of successful signal reception. In other words, MIMO techniques use multiple antennas on an AP 105 or multiple antennas on a STA 110 in the coverage area 125 to take advantage of multipath environments to transmit multiple data streams.

The AP 105 also may implement MU-MIMO transmissions in which the AP 105 simultaneously transmits independent data streams to multiple STAs 110. In one example of an MU-N transmission (such as MU-2, MU-3, MU-4, etc.), an AP 105 simultaneously transmits signals to N STAs. Thus, when the AP 105 has traffic for many STAs 110, the AP 105 increases network throughput by aggregating individual streams for each STA 110 in the group into a single MU-MIMO transmission.

In implementing various MIMO techniques and operations, the AP 105 (such as a beamformer device) relies on multi-user channel sounding procedures performed with the STAs 110 (such as a beamformee devices) in the coverage area 125 to determine how to radiate energy in a preferred direction. The AP 105 may sound the channel by transmitting null data packet announcement (NDPA) frames and null data packet (NDP) frames to a number of the STAs 110 such as STA-1, STA-2, STA-3, STA-4, STA-5, and STA-6. The AP 105 has knowledge that the STA-7 does not support MU-MIMO operations, for instance, and does not include the STA-7 in the multi-user channel sounding procedure.

FIG. 1 shows an example wireless communications scenario supporting guard interval selection using compressed beamforming information. The wireless communication scenario depicts a beamformer wireless device (such as an AP) receiving beamforming information from each of a plurality of beamformee wireless devices (such as STAs) sequentially. A wireless communications system 200 depicts an example where a beamformer wireless device (such as an AP 105-a) receives beamforming information from each of a plurality of beamformee wireless devices (such as STAs 110-a, 110-b, and 110-c). In some implementations, the AP 105-a and the STAs 110-a, 110-b, and 110-c may be examples of the AP 105 and the STAs 110 of FIG. 1.

The AP 105-a may sound the channel by transmitting null data packet announcement (NDPA) frames 205 and null data packet (NDP) frames 210 to a number of the STAs 110 such as STA 110-a, 110-b, and 110-c. The NDPA frame 205 and NDP frame 210 may be separated in time by a short interframe spacing (SIFS). The sounding procedure enables the endpoints at either side of a link to get maximum performance by taking advantage of channels that have strong performance while avoiding paths and carriers that have weak performance.

In response to receiving the NDPA frame 205, and after a SIFS following the NDP frame 210, a first of the STAs (such as STA-1 110-a) may transmit beamforming information (CBF 1 215-a (such as a very high throughput (VHT) CBF frame)) to the AP 105-a.

In response to receiving CBF 1 215-a, and after a SIFS following the CBF 1 215-a, the AP 105 may transmit a beamforming report poll frame (such as BRPoll 220-a) to trigger the transmission of beamforming information (CBF 2 215-b) by a second of the STAs (such as STA-2 110-b). The AP 105-a and STAs may then alternately and sequentially transmit BRPoll 220-b, CBF 3 215-c, etc., until all beamforming information (such as beamforming information from M STAs) is received by the AP 105-a. Other STAs outside of the sounding procedure may simply defer channel access until the sounding procedure is complete. The CBFs 215 contain CBF report information, portions of which AP 105 may use to determine multi-user (MU) signal-to-interference-plus-noise-ratio (SINR) metrics for the STAs 110.

The CBFs 215 may include, for example, feedback information such as a compressed beamforming feedback matrix V compressed in the form of angles (i.e., phi Φ and psi Ψ angles) that are quantized according to a standard (such as IEEE 802.11ac). The CBFs 215 also may include feedback signal-to-noise ratio (SNR) values (such as an Average SNR of Space-Time Stream Nc, where Nc is the number of columns in the compressed beamforming feedback matrix V). Each SNR value per-tone in stream i (before being averaged) may correspond to the SNR associated with the column i of the beamforming feedback matrix V determined for the STA 110. The feedback SNR values may be based at least in part on the NDP frames 210 in the channel sounding procedure, and therefore each of these feedback SNR values may generally correspond to a SNR that a particular STA 110 may experience in a single-user (SU) transmission from the AP 105-a to the particular STA 110. The AP 105-a may sequentially collect the CBFs 215 from the STAs 110 and use the feedback information to determine the SINR metrics, grouping metrics, and beamforming steering matrices in some examples. In single-user beamforming, there may be one feedback matrix from the bearnformee and one steering matrix used. In multi-user beamforming, each beamformee may send a feedback matrix, and the beamformer must maintain a steering matrix for each client.

Figure 2:
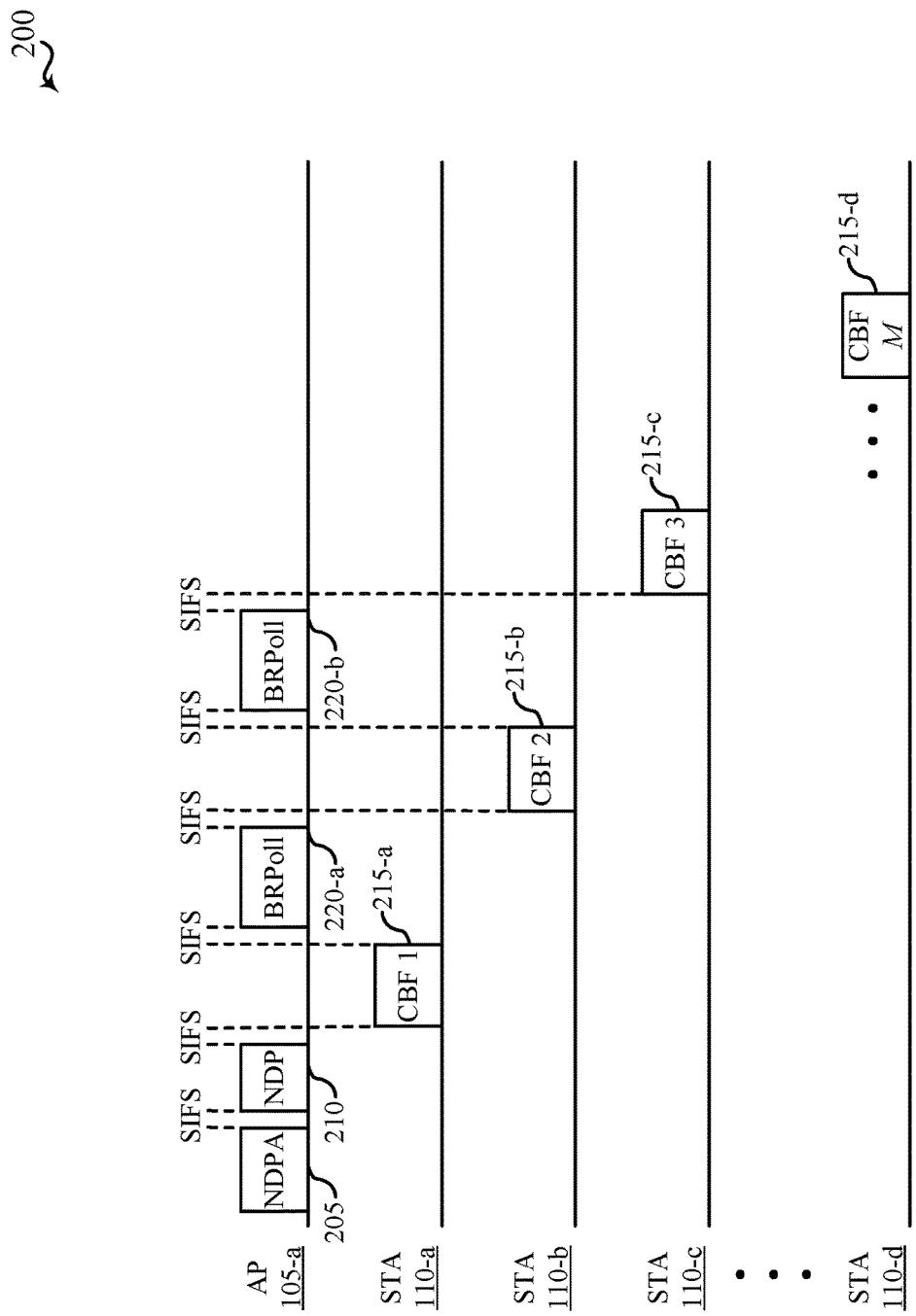
FIG. 2 shows an example wireless communications scenario supporting guard interval selection using compressed beamforming information.
Figure 3:
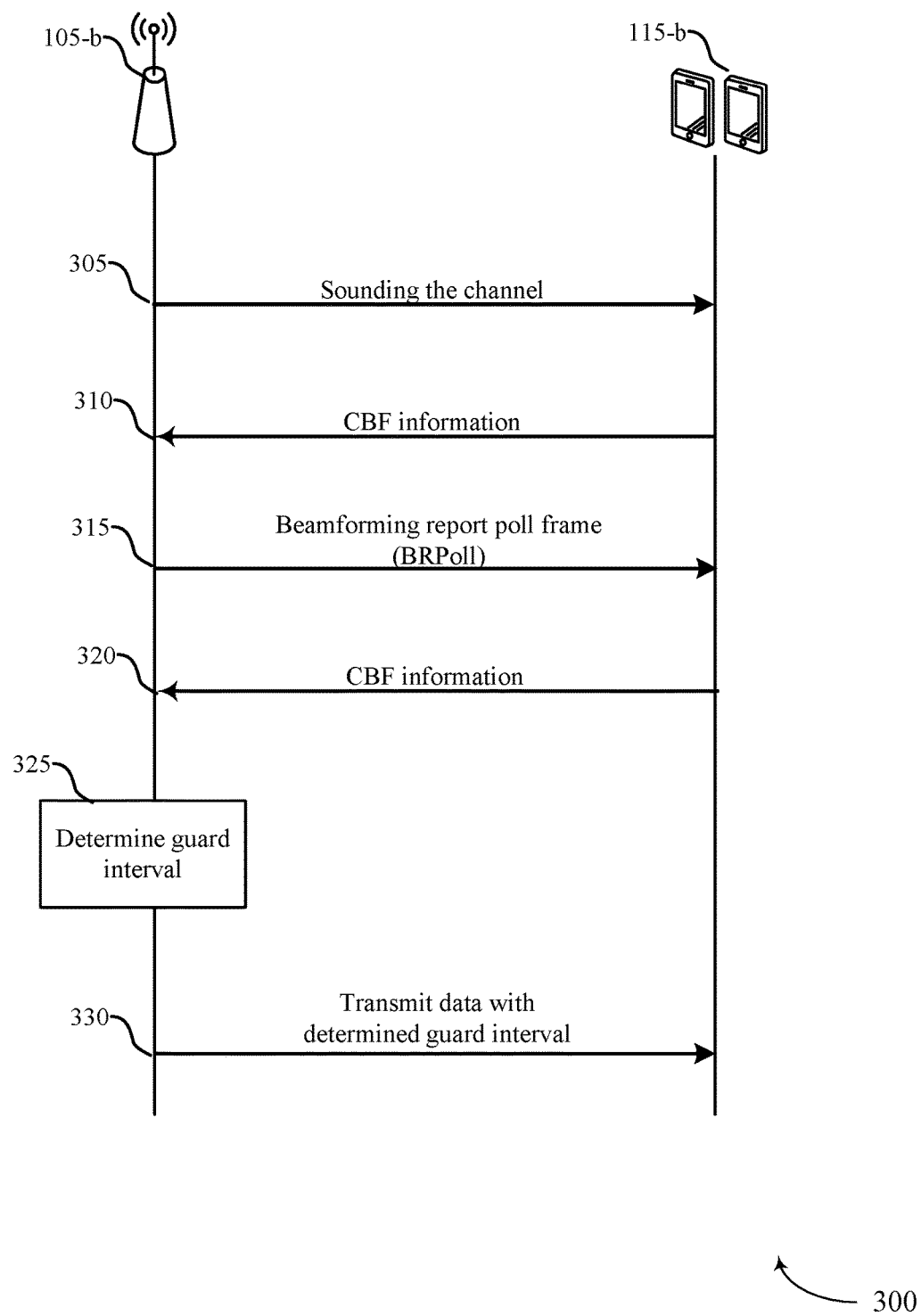
FIG. 3 shows an example guard interval selection using compressed beamforming information.

FIG. 3 shows an example guard interval selection using compressed beamforming information. In some cases, a flow diagram 300 may represent aspects of techniques performed by a STA 110 or an AP 105 as described with reference to FIGS. 1 and 2. In initiating a guard interval selection procedure, the AP 105-b may sound a channel via transmission 305 to a number of the STAs 110-b. The transmission 305 may include NDPA frames and NDP frames as described with reference to FIG. 2.

Upon receiving the NDPA and NDP frames in the transmission 305, one or more of the STAs 110-b may then transmit CBF information to the AP 105-b. A first STA from the one or more STAs 110-b may transmit CBF information 310 to the AP 105-b. In response to receiving the CBF information from the first STA, and after a SIFS following the CBF information, the AP 105-b may transmit a BRPoll 315 to trigger the transmission of the CBF information 320 by a second of the STAs 110-b. The AP 105-b and STAs 110-b may then alternately and sequentially transmit BRPoll frames, CBF information, etc., until all beamforming information is received by the AP 105-b.

At block 325, the AP 105-b may determine an appropriate guard interval for data transmission 330. The AP 105-b may utilize a number of techniques in determining an appropriate guard interval. For example, in a multi-user sounding procedure, the AP 105-b may obtain per-tone SNR information for a channel from received CBF information. In a first implementation, the AP 105-b may apply a fast Fourier transform (FFT) on the per-tone SNR information to obtain an indication of frequency variation within the per-tone SNR information. The obtained frequency variation may be used to determine a delay spread of the channel. For example, high frequency variation in the per-tone SNR information may be indicative of a high delay spread channel whereas low frequency variation may signal a low delay spread channel. AP 105-b may implement multiple thresholds that correspond to various guard intervals. As an example, in the 802.11ax specification there may be four guard interval options that are supported: 400 ns, 800 ns, 1.6 µs, and 3.2 µs. If the delay spread of a channel is below a first threshold, the AP 105-b may utilize the 400 ns guard interval in its transmissions. If the delay spread of the channel is greater than the first threshold but less than a second threshold, the AP 105-b may utilize the 800 ns guard interval in its transmissions. If the delay spread of the channel is greater than the second threshold but less than a third threshold, the AP 105-b may utilize the 1.6 µs guard interval in its transmissions. If the delay spread of the channel is greater than the third threshold, the AP 105-b may utilize the 3.2 µs guard interval in its transmissions. The guard interval values are provided as an example, however, various guard interval values may correspond to the thresholds.

In some implementations for determining an appropriate guard interval for data transmission 330, the AP 105-b may obtain per-tone SNR information for a channel, SNR_i, for a number of tones (i=1, N, where N is the number of tones). The AP 105-b may calculate an average SNR, SNRavg, where:

$$SNR_{avg}=(SNR\_1+ \ldots +SNR\_N)/N \quad \text{(Equation 1)}$$

For a selected subset of M tones (M<=N), at tone locations $L_1, \ldots L_M$, ($1<=L_1< \ldots <L_M<=N$), the AP 105-b may utilize the SNR information for each of the selected subset of M tones (SNR_$L_1$, ... SNR_$L_M$) to calculate a difference of SNRs (SNRDiff) on two consecutive tones, where:

$$SNRDiff\_L_1=SNR\_L_1-SNR_{avg}$$

....

$$SNRDiff\_L_M=SNR\_L_M-SNR_{avg} \quad \text{(Equation 2)}$$

With the differences of SNRs, the AP 105-b may compute the absolute value of each difference of SNRs (AbsSNRDiff), where:

$$AbsSNRDiff\_L_1=abs(SNRDiff\_L_1)$$

....

$$AbsSNRDiff\_L_M=abs(SNRDiff\_L_M) \quad \text{(Equation 3)}$$

With the absolute value of each difference of SNRs, the AP 105-b may compute the average of these values (AvgAbsSNRDiff) or the median of these values (MedAbsSNRDiff) where:

$$AvgAbsSNRDiff=(AbsSNRDiff\_L_1+ \ldots +AbsSNRDiff\_L_M)/M \quad \text{(Equation 4)}$$

or $$MedAbsSNRDiff=median(AbsSNRDiff\_L_1, \ldots AbsSNRDiff\_L_M) \quad \text{(Equation 5)}$$

The AP 105-b may implement multiple thresholds that correspond to various guard intervals. Using the 802.11ax specification again as an example, if the calculated average of the absolute value of the selected differences of SNRs or the median of the absolute value of the selected differences of SNRs is below a first threshold, the AP 105-b may utilize the 400 ns guard interval in its transmissions. If the calculated average of the absolute value of the selected differences of SNRs or the median of the absolute value of the selected differences of SNRs is greater than the first threshold but less than a second threshold, the AP 105-b may utilize the 800 ns guard interval in its transmissions. If the calculated average of the absolute value of the selected differences of SNRs or the median of the absolute value of the selected differences of SNRs is greater than the second threshold but less than a third threshold, the AP 105-b may utilize the 1.6 µs guard interval in its transmissions. If the calculated average of the absolute value of the selected differences of SNRs or the median of the absolute value of the selected differences of SNRs is greater than the third threshold, the AP 105-b may utilize the 3.2 µs guard interval in its transmissions. The guard interval values are provided as an example, however, various guard interval values may correspond to the thresholds.

In another implementation for determining an appropriate guard interval for data transmission 330, the AP 105-*b* may obtain per-tone SNR information for a channel, SNR_i, for a number of tones (i=1, ... N, where N is the number of tones). From the obtained per-tone SNR information, the AP 105-*b* may select M pairs of tones (M<=N−1), at tone locations ($L_1$, $L_{1+1}$), ... ($L_M$, $L_{M+1}$), with 1<=$L_1$< ... <$L_M$<=N−1. The M pairs of tones may have corresponding pairs of SNR information (SNR_$L_1$, SNR (SNR_$_{L1+1}$), ... (SNR_$L_M$, SNR_$L_{M+1}$). The AP 105-*b* may calculate a difference of SNRs (SNRDiff) on two consecutive tones, where:

SNRDiff_$L_1$=SNR_$L_{1+1}$−SNR_$L_1$

. . . .

SNRDiff_$L_M$=SNR_$L_{M+1}$−SNR_$L_M$        (Equation 6)

With the difference of SNRs for each of the selected M pairs of tones, the AP 105-*b* may compute the absolute value of each difference of SNRs (AbsSNRDiff), where:

AbsSNRDiff_$L_1$=abs(SNRDiff_$L_1$)

. . . .

AbsSNRDiff_$L_M$=abs(SNRDiff_$L_M$)        (Equation 7)

With the absolute value of each difference of SNRs, the AP 105-*b* may compute the average of these values (AvgAbsSNRDiff) or the median of these values (MedAbsSNRDiff) where:

AvgAbsSNRDiff=(AbsSNRDiff_$L_1$+ ... +AbsSNRDiff_$L_M$)/M        (Equation 8)

or

MedAbsSNRDiff=median(AbsSNRDiff_$L_1$, ... AbsSNRDiff_$L_M$)        (Equation 9)

The AP 105-*b* may implement multiple thresholds that correspond to various guard intervals. Using the 802.11ax specification again as an example, if the calculated average of the absolute value of the selected differences of SNRs or the median of the absolute value of the selected differences of SNRs is below a first threshold, the AP 105-*b* may utilize the 400 ns guard interval in its transmissions. If the calculated average of the absolute value of the selected differences of SNRs or the median of the absolute value of the selected differences of SNRs is greater than the first threshold but less than a second threshold, the AP 105-*b* may utilize the 800 ns guard interval in its transmissions. If the calculated average of the absolute value of the selected differences of SNRs or the median of the absolute value of the selected differences of SNRs is greater than the second threshold but less than a third threshold, the AP 105-*b* may utilize the 1.6 μs guard interval in its transmissions. If the calculated average of the absolute value of the selected differences of SNRs or the median of the absolute value of the selected differences of SNRs is greater than the third threshold, the AP 105-*b* may utilize the 3.2 μs guard interval in its transmissions. The guard interval values are provided as an example, however, various guard interval values may correspond to the thresholds.

The AP 105-*b* also may utilize another implementation for determining an appropriate guard interval for data transmission 330. In the received CBF information, the AP 105-*b* may obtain both per-tone SNR information and compressed beamforming feedback matrix frames (compressed V matrix). The compressed V matrix may include magnitude and phase information for each antenna combination utilized by the AP 105-*b* and STA 110-*b*. From the per-tone SNR information for a channel, SNR_i, for a number of tones (i=1, ... N, where N is the number of tones), an SNR matrix, (S matrix), may be constructed as follows:

$$\begin{bmatrix} SNR\_1 & 0 & ... & 0 \\ 0 & SNR\_2 & ... & 0 \\ 0 & 0 & ... & SNR\_N \end{bmatrix}$$

The S matrix is reconstructed as diag(10^((average-per-stream SNR in dB+delta SNR in dB)/20)), where diag(x) is a diagonal matrix with the entries of vector x on the diagonal.

With the S matrix and the compressed V matrix, the AP 105-*b* can recover a partial channel frequency response, H, where H=SV'. The dimensions of the V matrix per-tone are Nr×Nc, the dimensions of the S matrix are Nc×Nc, and the dimensions of the H matrix are Nc×Nr, where Nc and Nr are the CBF parameters representing, respectively, the number of space-time-streams (Nsts) and the number of the AP 105-*b*'s transmission antennas (N_tx).

The AP 105-*b* may convert the H matrix to a time domain channel impulse response (CIR), h, through an inverse fast Fourier transform (IFFT). The IFFT of the H matrix will result in Nr×Nc IFFT outputs. To combine these outputs, the AP 105-*b* may use maximal-ratio combining (MRC) on the IFFT output. With the CIR, h, AP 105-*b* may calculate the power of h (h_pow), where:

$h\_pow=real(h)^2+imag(h)^2$        (Equation 10)

The AP 105-*b* may determine a multipath delay of the channel utilizing h_pow. The AP 105-*b* may set a minimum channel impulse response power threshold to ascertain whether a received impulse response constitutes a multipath. The channel impulse response power threshold may be determined from the peak power of h_pow, the noise power of h_pow, or a combination of the two. Based on the channel impulse response power threshold, the AP 105-*b* may determine a first received impulse response that exceeds the channel impulse response power threshold and a last received impulse response that exceeds the channel impulse response power threshold. From the first and last received impulse responses, the AP 105-*b* may determine a multipath delay of the channel.

The AP 105-*b* may implement multiple thresholds that correspond to various guard intervals. Using the 802.11ax specification again as an example, if the multipath delay is below a first threshold, the AP 105-*b* may utilize the 400 ns guard interval in its transmissions. If the multipath delay is greater than the first threshold but less than a second threshold, the AP 105-*b* may utilize the 800 ns guard interval in its transmissions. If the multipath delay is greater than the second threshold but less than a third threshold, the AP 105-*b* may utilize the 1.6 μs guard interval in its transmissions. If the multipath delay is greater than the third threshold, the AP 105-*b* may utilize the 3.2 μs guard interval in its transmissions. The guard interval values are provided as an example, however, various guard interval values may correspond to the thresholds.

The AP 105-*b* may utilize one additional implementation for determining an appropriate guard interval for data transmission 330. In a single-user (SU) transmit beamforming (TxBF) case, a delta SNR for the per-tone SNR information may not be available. In this case, the AP 105-*b* may use an average SNR ($SNR_{avg}$) of the per-tone SNR information to reconstruct an S matrix as follows:

$$\begin{bmatrix} SNRavg & 0 & \ldots & 0 \\ 0 & SNRavg & \ldots & 0 \\ 0 & 0 & \ldots & SNRavg \end{bmatrix}$$

The S matrix is reconstructed as diag(10^(average-per-stream SNR in dB/20)), where diag(x) is a diagonal matrix with the entries of vector x on the diagonal.

With the S matrix and the compressed V matrix, the AP 105-*b* can recover a partial channel frequency response, H, where H=SV'. The dimensions of the V matrix per-tone are Nr×Nc, the dimensions of the S matrix are Nc×Nc, and the dimensions of the H matrix are Nc×Nr, where Nc and Nr are the CBF parameters representing, respectively, the number of space-time-streams (Nsts) and the number of the AP 105-*b*'s transmission antennas (N_tx).

The AP 105-*b* may convert the H matrix to a time domain channel impulse response (CIR), h, through an inverse fast Fourier transform (IFFT). The IFFT of the H matrix will result in Nr×Nc IFFT outputs. To combine these outputs, the AP 105-*b* may use maximal-ratio combining (MRC) on the IFFT output. With the CIR, h, AP 105-*b* may calculate the power of h (h_pow), where:

$$h\_pow = \text{real}(h)^2 + \text{imag}(h)^2 \quad \text{(Equation 11)}$$

The AP 105-*b* may determine a multipath delay of the channel utilizing h_pow. The AP 105-*b* may set a minimum channel impulse response power threshold to ascertain whether a received impulse response constitutes a multipath. The channel impulse response power threshold may be determined from the peak power of h_pow, the noise power of h_pow, or a combination of the two. Based on the channel impulse response power threshold, the AP 105-*b* may determine a first received impulse response that exceeds the channel impulse response power threshold and a last received impulse response that exceeds the channel impulse response power threshold. From the first and last received impulse responses, the AP 105-*b* may determine a multipath delay of the channel.

The AP 105-*b* may implement multiple thresholds that correspond to various guard intervals. Using the 802.11ax specification again as an example, if the multipath delay is below a first threshold, the AP 105-*b* may utilize the 400 ns guard interval in its transmissions. If the multipath delay is greater than the first threshold but less than a second threshold, the AP 105-*b* may utilize the 800 ns guard interval in its transmissions. If the multipath delay is greater than the second threshold but less than the third threshold, the AP 105-*b* may utilize the 1.6 µs guard interval in its transmissions. If the multipath delay is greater than the third threshold, the AP 105-*b* may utilize the 3.2 µs guard interval in its transmissions. The guard interval values are provided as an example, however, various guard interval values may correspond to the thresholds.

Once the AP 105-*b* has determined an appropriate guard interval utilizing one of the techniques described above, the AP 105-*b* may employ the determined guard interval in a transmission 330 with one or more of the STAs 110-*b*. The transmission 330 may include a plurality of OFDM symbols. The transmission 330 may include multiple transmissions where each transmission may have its own modulation speed and coding.

Figure 4A:
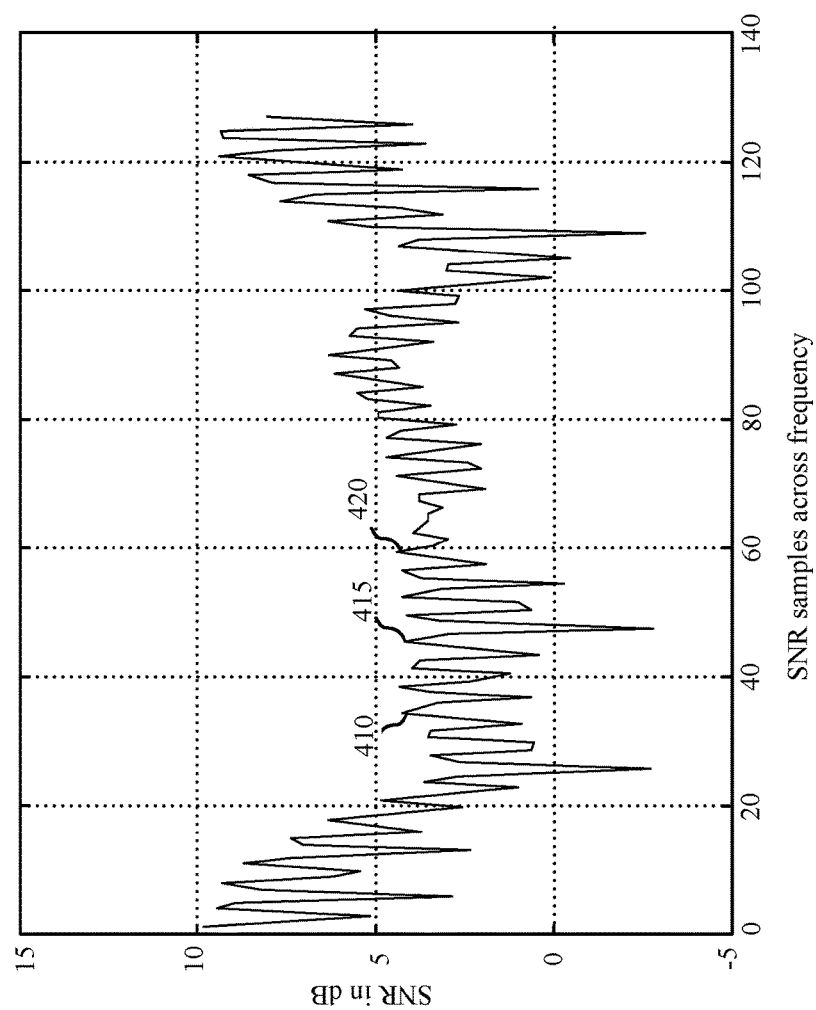
FIG. 4A shows an example per-tone SNR plot supporting guard interval selection using compressed beamforming information.

FIG. 4A shows an example per-tone SNR plot supporting guard interval selection using compressed beamforming information. A per-tone SNR plot 400 depicts a frequency domain representation of per-tone SNR information for a channel from received CBF information. Characteristics of the per-tone SNR plot 400 may be used by the AP 105 to determine an appropriate guard interval for data transmissions.

Impulse 410, impulse 415, and impulse 420 may be SNR values of the tones depicted in the per-tone SNR plot 400. The frequency variation of the impulses may be indicative of high frequency variation within the frequency response of the channel. High frequency variation may be indicative of a large delay spread of the channel. The delay spread of the channel may be determined using a fast Fourier transform (FFT) that is applied to the sequence of SNR values in the per-tone SNR plot 400 as explained below.

Figure 4B:
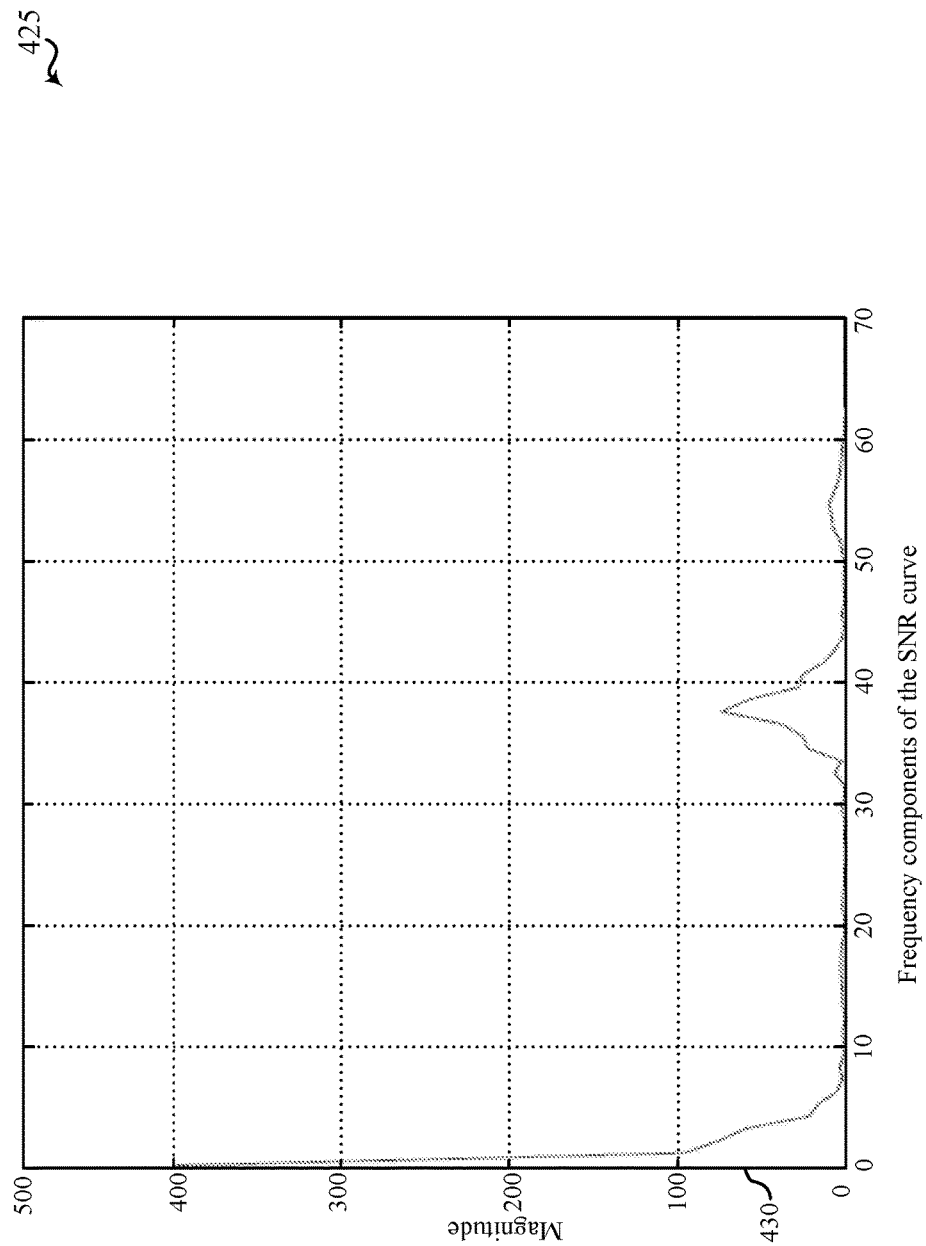
FIG. 4B shows an example frequency domain plot supporting guard interval selection using compressed beamforming information.

FIG. 4B shows an example frequency domain plot 425 supporting guard interval selection using compressed beamforming information. The frequency domain plot 425 depicts a frequency domain representation of a per-tone SNR plot obtained using a FFT. Characteristics of the frequency domain plot 425 may be used by the AP 105 to determine an appropriate guard interval for data transmissions.

After the FFT is performed to the sequence of SNR values, a delay spread of the channel may be determined. The delay spread of the channel may be quantified through various techniques. One such technique is to compute the root mean square (RMS) delay spread as the standard deviation value of the delay of multipath reflections, weighted proportionally to the energy in the reflected waves. The energy of the reflected waves may be represented by the y-axis 430 of the frequency domain plot 425.

A large delay spread of the channel may correspond to the AP 105 utilizing a longer guard interval in its data transmissions. As an example, the calculated RMS delay spread of the frequency response depicted in frequency domain plot 425 may be approximately 500 ns. If the AP 105 utilizes a first delay spread threshold of 0-150 ns associated with a 400 ns guard interval, a second delay spread threshold 151-300 ns associated with an 800 ns guard interval, a third delay spread threshold of 301-450 ns associated with a 1.6 µs guard interval, and a fourth delay spread threshold of 451 ns and above associated with a 3.2 µs guard interval, the AP 105-*b* may incorporate the 3.2 µs guard interval associated with the fourth threshold based on the frequency domain plot 425 show in FIG. 4B.

Figure 4C:
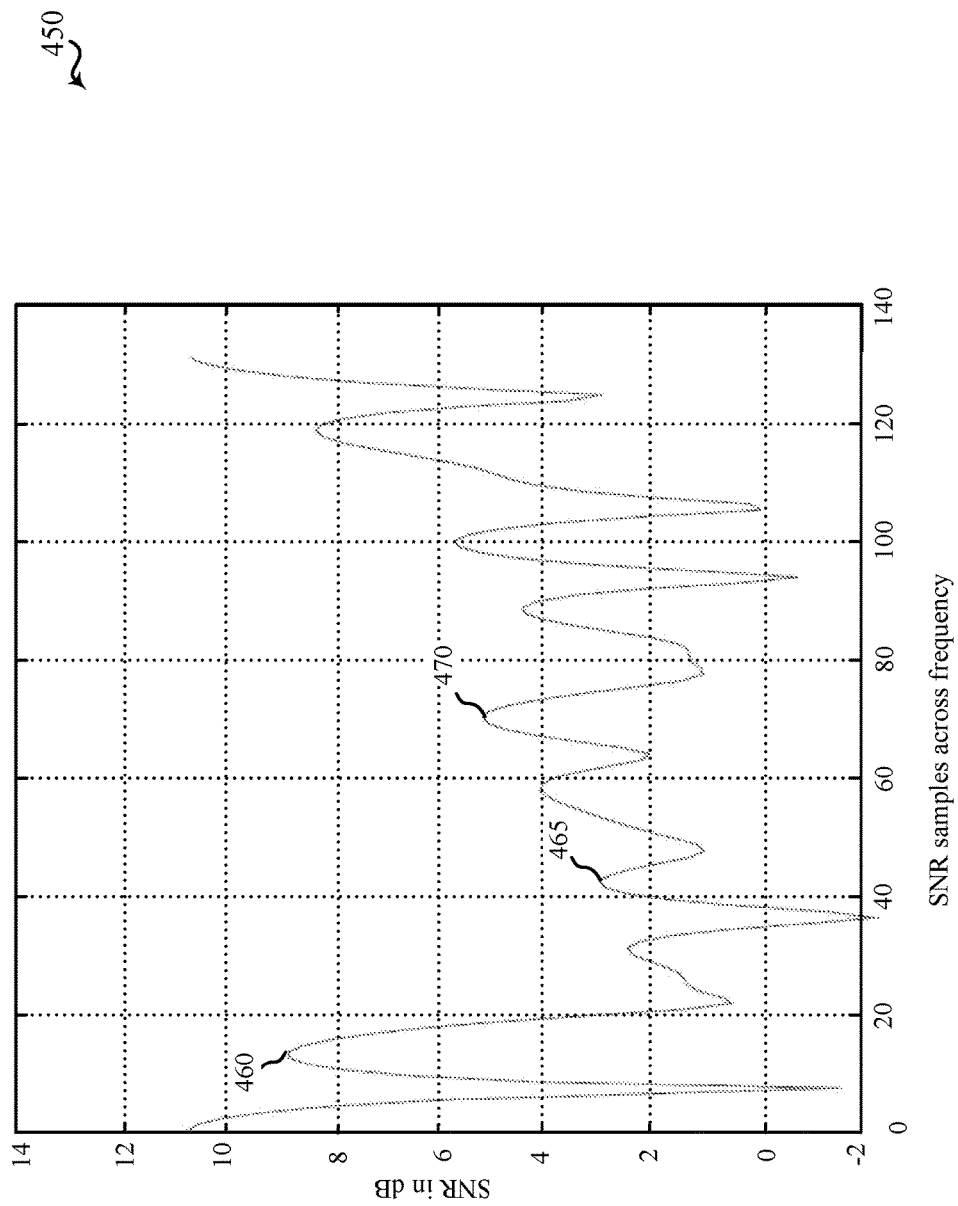
FIG. 4C shows an example per-tone SNR plot supporting guard interval selection using compressed beamforming information

FIG. 4C shows an example per-tone SNR plot 450 supporting guard interval selection using compressed beamforming information. The per-tone SNR plot 450 depicts a frequency domain representation of per-tone SNR information for a channel from received CBF information. Characteristics of the per-tone SNR plot 450 may be used by the AP 105 to determine an appropriate guard interval for data transmissions.

Impulse 460, impulse 465, and impulse 470 may be SNR values of the tones depicted in the per-tone SNR plot 450. The frequency variation of the impulses may be indicative of low frequency variation within the frequency response of the channel. Low frequency variation may be indicative of a small delay spread of the channel. The delay spread of the channel may be determined through a FFT that is applied to the sequence of SNR values in the per-tone SNR plot 450 as explained below.

Figure 4D:
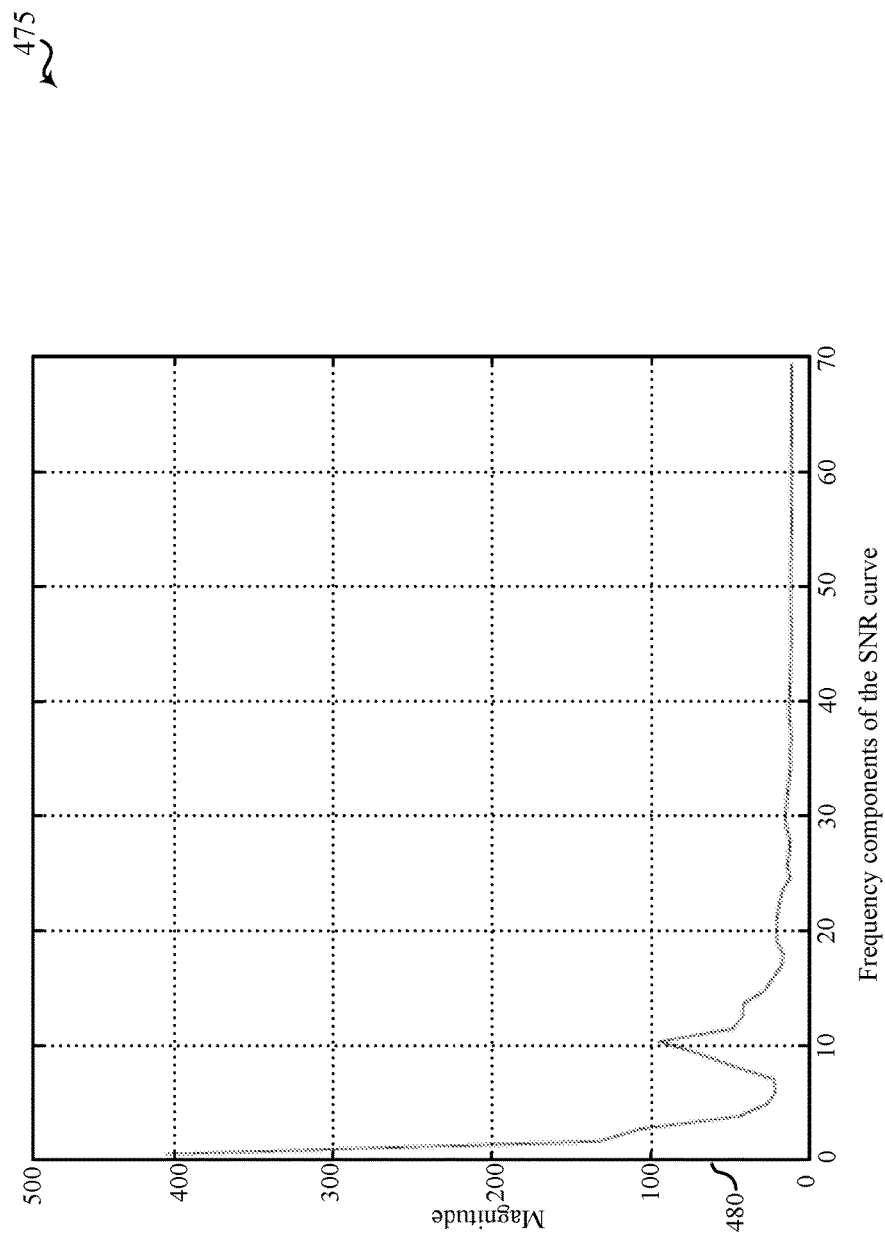
FIG. 4D shows an example frequency domain plot supporting guard interval selection using compressed beamforming information.

FIG. 4D shows an example frequency domain plot 475 supporting guard interval selection using compressed beamforming information. The frequency domain plot 475 depicts a frequency domain representation of a per-tone SNR plot after a fast Fourier transform (FFT) has been applied to it. Characteristics of the frequency domain plot 475 may be used by the AP 105 to determine an appropriate guard interval for data transmissions.

After an FFT is applied to the sequence of SNR values, a delay spread of the channel may be determined. The delay spread of the channel may using, for example, the RMS delay spread technique discussed with respect to FIG. 4B. The energy of the reflected waves may be represented by the y-axis 480 of the frequency domain plot 475.

In an implementation described above, a small delay spread of the channel may correspond to the AP 105 utilizing a shorter guard interval in its data transmissions. As an example, the calculated RMS delay spread of the frequency response depicted in per-tone SNR plot 450 may be approximately 30 ns. If the AP 105 utilizes a first delay spread threshold of 0-150 ns associated with a 400 ns guard interval, a second delay spread threshold 151-300 ns associated with an 800 ns guard interval, a third delay spread threshold of 301-450 ns associated with a 1.6 μs guard interval, and a fourth delay spread threshold of 451 ns and above associated with a 3.2 μs guard interval, the AP 105-*b* may incorporate the 400 ns guard interval associated with the first threshold.

Figure 5:
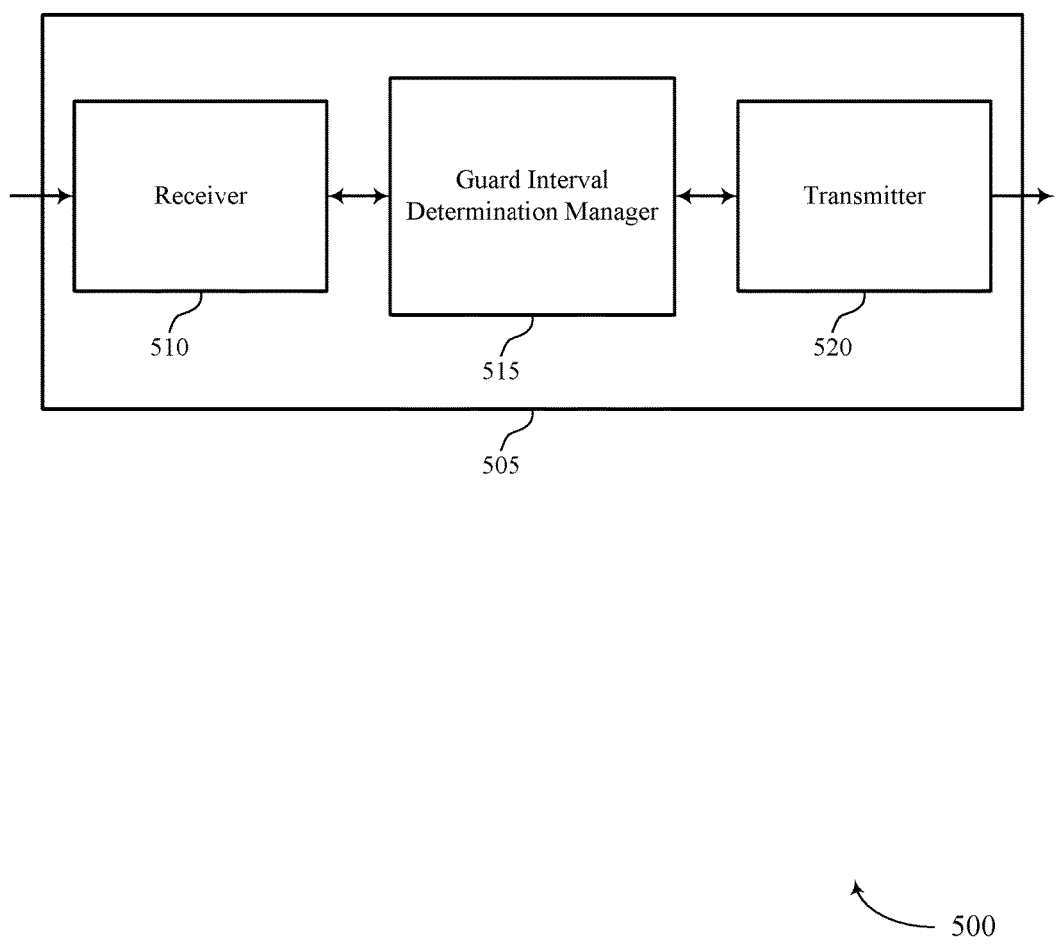
FIGS. 5-7 show example devices supporting guard interval selection using compressed beamforming information.

FIG. 5 shows an example device supporting guard interval selection using compressed beamforming information. Block diagram 500 shows a device 505 that may be an example of aspects of an access point (AP) 105 as described herein. The device 505 may include a receiver 510, a guard interval determination manager 515, and a transmitter 520. The device 505 also may include a processor. Each of these components may be in communication with one another (such as via one or more buses).

The receiver 510 may receive information such as packets, user data, or control information associated with various information channels (such as control channels, data channels, and information related to throughput optimization by guard interval selection from beamforming feedback, etc.). Information may be passed on to other components of the device. The receiver 510 may be an example of aspects of the transceiver 835 described with reference to FIG. 8. The receiver 510 may utilize a single antenna or a set of antennas.

The guard interval determination manager 515 may be an example of aspects of the guard interval determination manager 815 described with reference to FIG. 8.

The guard interval determination manager 515 may obtain CBF information from one or more STAs as part of a sounding procedure. The CBF information may include per-tone SNR information for a channel and determine a guard interval based on the per-tone SNR information for the channel.

The transmitter 520 may transmit signals generated by other components of the device. In some implementations, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas. The transmitter 520 may transmit a set of OFDM symbols utilizing the determined guard interval.

Figure 6:
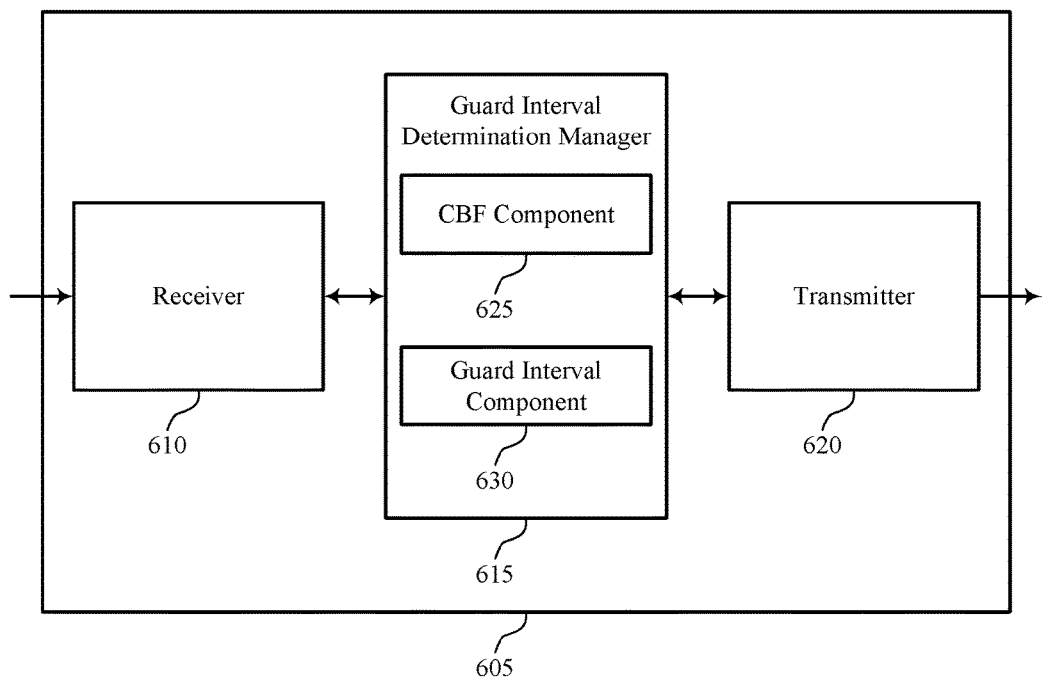

FIG. 6 shows an example device supporting guard interval selection using compressed beamforming information. Block diagram 600 shows a device 605 that may be an example of aspects of a device 505 or an AP 105 as described with reference to FIG. 5. The device 605 may include a receiver 610, a guard interval determination manager 615, and a transmitter 620. The device 605 also may include a processor. Each of these components may be in communication with one another (such as via one or more buses).

The receiver 610 may receive information such as packets, user data, or control information associated with various information channels (such as control channels, data channels, and information related to throughput optimization by guard interval selection from beamforming feedback, etc.). Information may be passed on to other components of the device. The receiver 610 may be an example of aspects of the transceiver 835 described with reference to FIG. 8. The receiver 610 may utilize a single antenna or a set of antennas.

The guard interval determination manager 615 may be an example of aspects of the guard interval determination manager 815 described with reference to FIG. 8. The guard interval determination manager 615 also may include the CBF component 625 and the guard interval component 630. The CBF component 625 may obtain CBF information from one or more STAs as part of a sounding procedure. The guard interval component 630 may determine a guard interval based on the per-tone SNR information for the channel.

The transmitter 620 may transmit signals generated by other components of the device. In some implementations, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
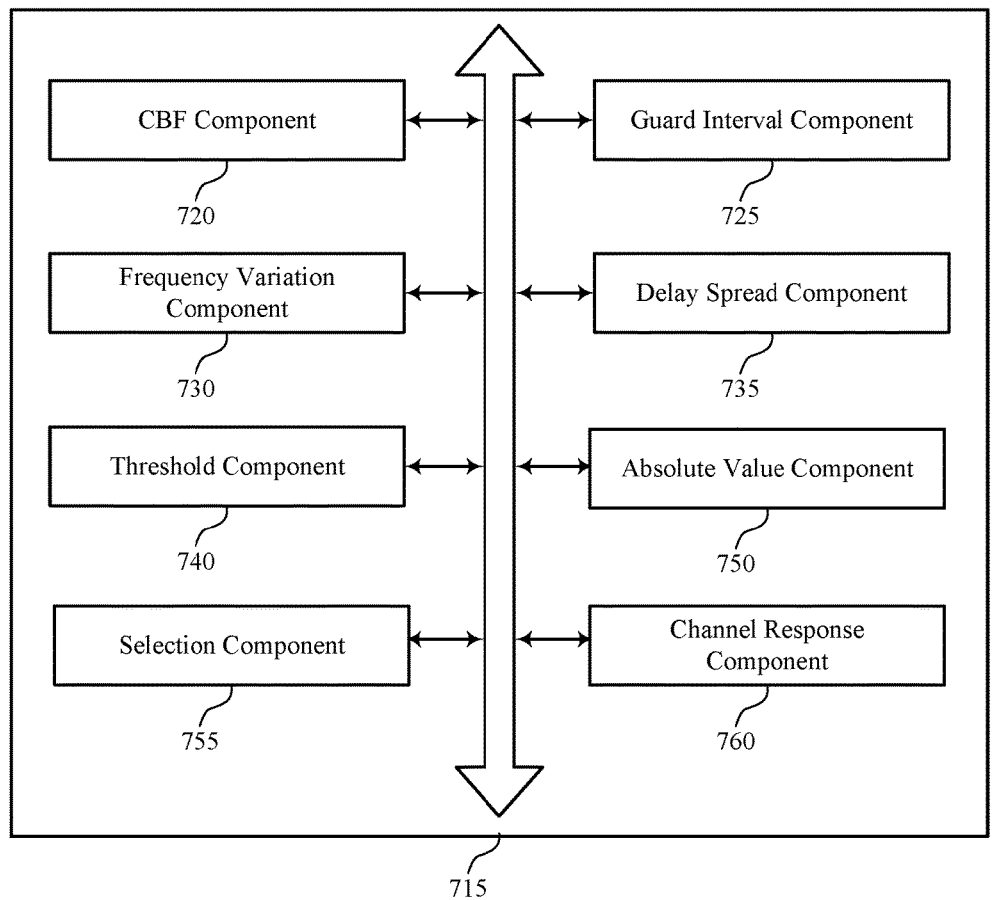

FIG. 7 shows an example device supporting guard interval selection using compressed beamforming information. Block diagram 700 shows a device 705. The guard interval determination manager 715 may be an example of aspects of a guard interval determination manager 515, a guard interval determination manager 615, or a guard interval determination manager 815 described with reference to FIGS. 5, 6, and 8. The guard interval determination manager 715 may include a CBF component 720, a guard interval component 725, a frequency variation component 730, a delay spread component 735, a threshold component 740, an absolute value component 750, a selection component 755, and a channel response component 760. Each of these modules may communicate, directly or indirectly, with one another (such as via one or more buses).

The CBF component 720 may obtain CBF information from one or more STAs as part of a sounding procedure. The guard interval component 725 may determine a guard interval based on the per-tone SNR information for the channel. The frequency variation component 730 may obtain an indication of frequency variation within the per-tone SNR information using an FFT of the per-tone SNR information. The delay spread component 735 may determine a delay spread based on the indication of frequency variation within the per-tone SNR information. The threshold component 740 may compare the determined delay spread against one or more thresholds. It also may compare a calculated mean or median against one or more thresholds and compare a determined multipath delay against one or more thresholds.

The absolute value component 750 may determine for at least two tones, an absolute value of a difference between an SNR from the CBF information and an average SNR of the channel for each of the at least two tones. With the absolute values, the absolute value component 750 may calculate a mean or median of the absolute values for the at least two tones. It also may determine an absolute value of a difference between an SNR for each tone in at least one selected pair of tones.

The selection component 755 may select at least one pair of tones from the CBF information. The channel response component 760 may obtain a partial channel frequency response based on a compressed beamforming feedback matrix and an SNR matrix for the channel and perform an inverse fast Fourier transform (IFFT) on the obtained partial channel frequency response to obtain a time domain channel impulse response. It also may calculate a power of the time domain channel impulse response, determine a multipath delay of the channel from the calculated power. The channel response component 760 also may calculate a channel impulse response power threshold to determine a first received impulse response and a last received impulse response based on a peak power, a noise power, or a combination thereof, of the calculated power.

Figure 8:
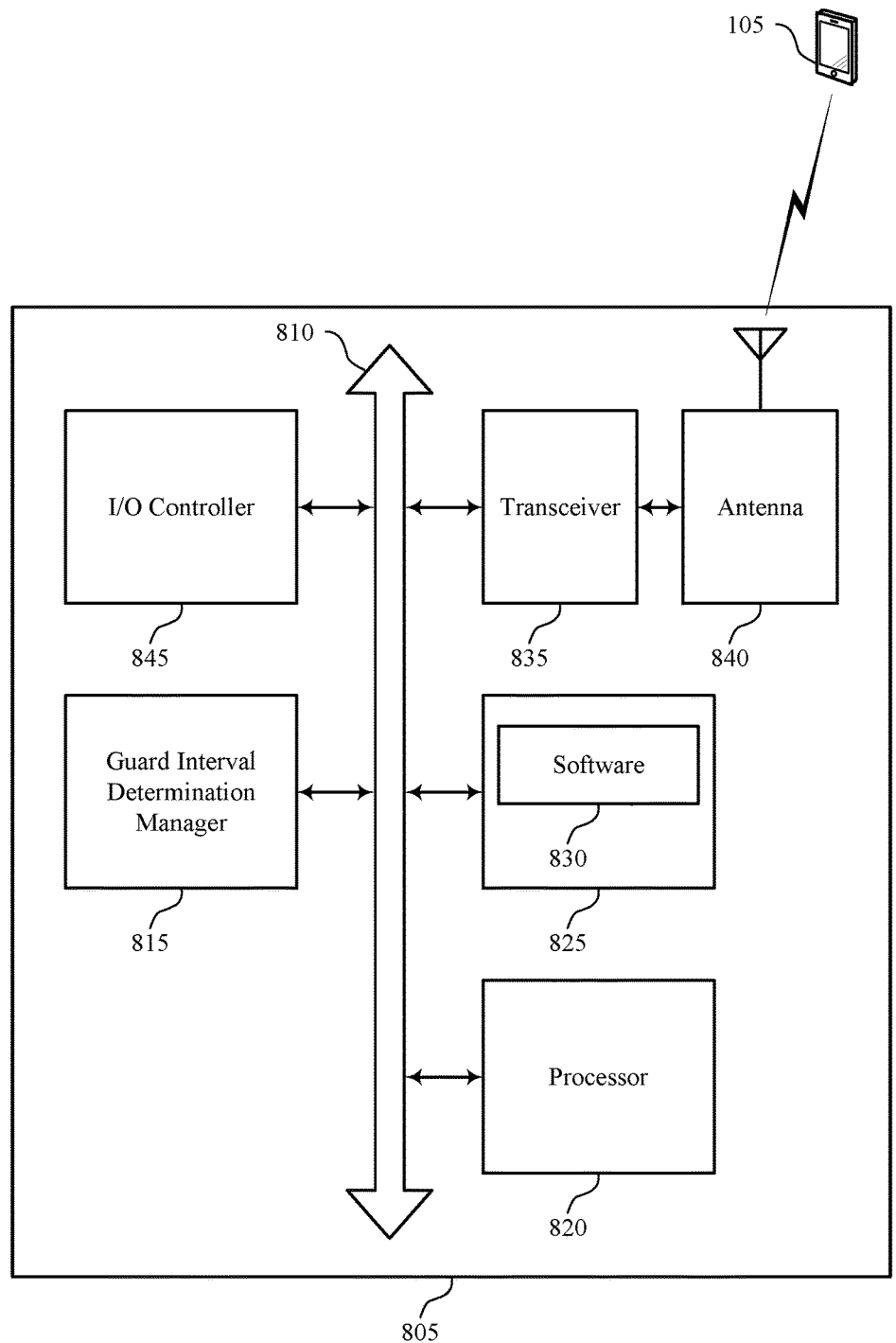
FIG. 8 shows an example system supporting guard interval selection using compressed beamforming information.

FIG. 8 shows an example device supporting guard interval selection using compressed beamforming information. Block diagram 800 shows a device 805 that may be an example of or include the components of the device 505, the device 605, or an AP 105 as described above, such as with reference to FIGS. 5 and 6. The device 805 may include components for bi-directional voice and data communications including components for transmitting and receiving communications, including a guard interval determination manager 815, a processor 820, memory 825, software 830, a transceiver 835, an antenna 840, and an I/O controller 845. These components may be in electronic communication via one or more buses (such as bus 810).

The software 830 stored on memory 825 may include code to implement aspects of the present disclosure, including code to support throughput optimization by guard interval selection from beamforming feedback.

The transceiver 835 may communicate bi-directionally, via one or more antennas, wired, or wireless links as described above. For example, the transceiver 835 may represent a wireless transceiver and may communicate bi-directionally with another wireless transceiver. The transceiver 835 also may include a modem to modulate the packets and provide the modulated packets to the antennas for transmission, and to demodulate packets received from the antennas.

In some cases, the device 805 may include a single antenna 840. However, in some cases the device may have more than one antenna 840, which may be capable of concurrently transmitting or receiving multiple wireless transmissions.

The I/O controller 845 may manage input and output signals for device 805. The I/O controller 845 also may manage peripherals not integrated into the device 805.

Figure 9:
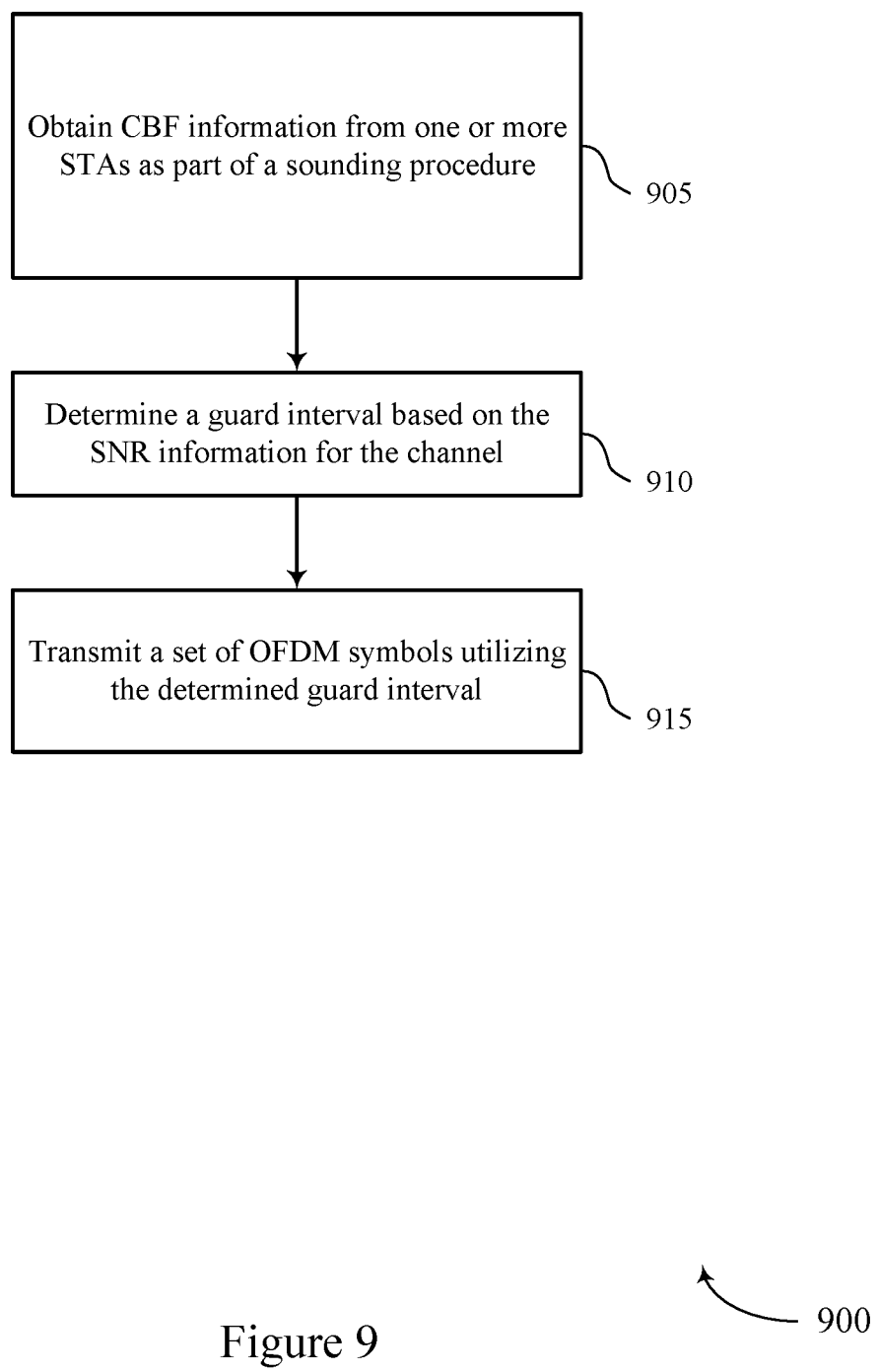
FIGS. 9-13 show example methods for guard interval selection using compressed beamforming information.

FIG. 9 shows an example method for guard interval selection using compressed beamforming information. The operations of the method 900 may be implemented by an AP 105 or its components as described herein. For example, the operations of the method 900 may be performed by a guard interval determination manager as described with reference to FIGS. 5-8. In some implementations, an AP 105 may execute a set of codes to control the functional elements of the device to perform the functions described below. Additionally, or alternatively, the AP 105 may perform aspects of the functions described below using special-purpose hardware.

At block 905 the AP 105 may obtain CBF information from one or more STAs as part of a sounding procedure. The operations of block 905 may be performed according to the methods described herein. In some implementations, aspects of the operations of block 905 may be performed by a CBF component as described with reference to FIGS. 5-8.

At block 910 the AP 105 may determine a guard interval based at least in part on the SNR information for the channel. The operations of block 910 may be performed according to the methods described herein. In some implementations, aspects of the operations of block 910 may be performed by a guard interval component as described with reference to FIGS. 5-8.

At block 915 the AP 105 may transmit a plurality of OFDM symbols utilizing the determined guard interval. The operations of block 915 may be performed according to the methods described herein. In some implementations, aspects of the operations of block 915 may be performed by a transmitter as described with reference to FIGS. 5-8.

Figure 10:
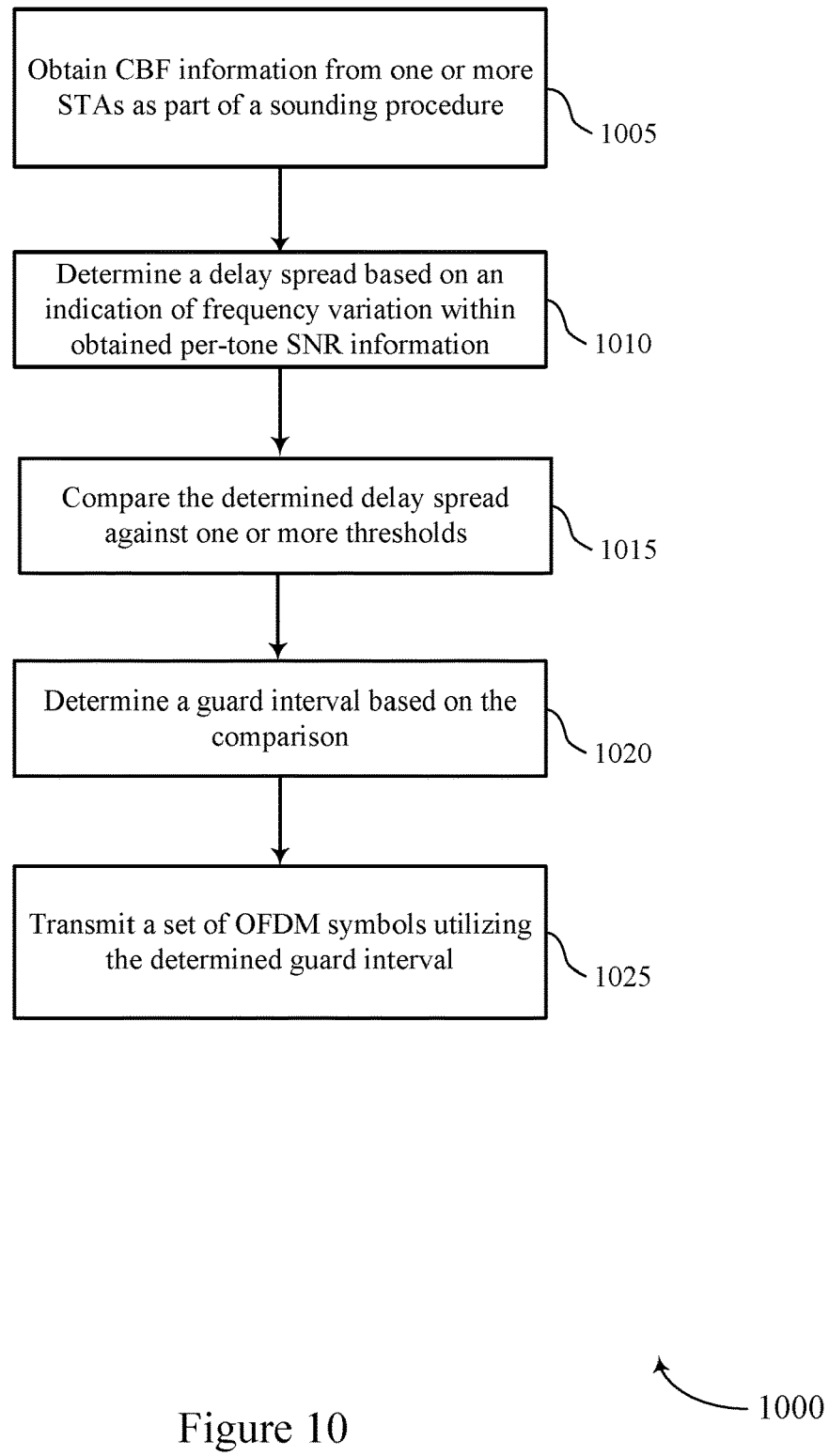

FIG. 10 shows an example method for guard interval selection using compressed beamforming information. The operations of the method 1000 may be implemented by an AP 105 or its components as described herein. For example, the operations of the method 1000 may be performed by a guard interval determination manager as described with reference to FIGS. 5-8. In some implementations, an AP 105 may execute a set of codes to control the functional elements of the device to perform the functions described below. Additionally, or alternatively, the AP 105 may perform aspects of the functions described below using special-purpose hardware.

At block 1005 the AP 105 may obtain CBF information from one or more STAs as part of a sounding procedure. The operations of block 1005 may be performed according to the methods described herein. In some implementations, aspects of the operations of block 1005 may be performed by a CBF component as described with reference to FIGS. 5-8.

At block 1010 the AP 105 may utilize an FFT on per-tone SNR information received in the CBF information to obtain an indication of frequency variation. With the indication of frequency variation, the AP 105 may determine a delay spread. In some implementations, aspects of the operations of block 1010 may be performed by the frequency variation component 730 and the delay spread component 735 as described with reference to FIG. 7.

At block 1015 the AP 105 may compare the determined delay spread against one or more thresholds. The AP 105 may implement multiple thresholds that correspond to various guard intervals. Using the 802.11ax specification as an example, if the delay spread is below a first threshold, the AP 105 may utilize the 800 ns guard interval in its transmissions. If the delay spread is greater than the first threshold but less than a second threshold, the AP 105 may utilize the 1.6 μs guard interval in its transmissions. If the delay spread is greater than the second threshold, the AP 105 may utilize the 3.2 μs guard interval in its transmissions. In some implementations, aspects of the operations of block 1015 may be performed by the guard interval determination manager as described with reference to FIGS. 5-8.

At block 1020 the AP 105 may determine a guard interval based on the comparison in block 1015. The operations of block 1020 may be performed according to the methods described herein. In some implementations, aspects of the operations of block 1020 may be performed by the guard interval determination manager as described with reference to FIGS. 5-8.

At block 1025 the AP 105 may transmit a plurality of OFDM symbols utilizing the determined guard interval. The operations of block 1025 may be performed according to the methods described herein. In some implementations, aspects of the operations of block 1025 may be performed by a transmitter as described with reference to FIGS. 5-8.

Figure 11:
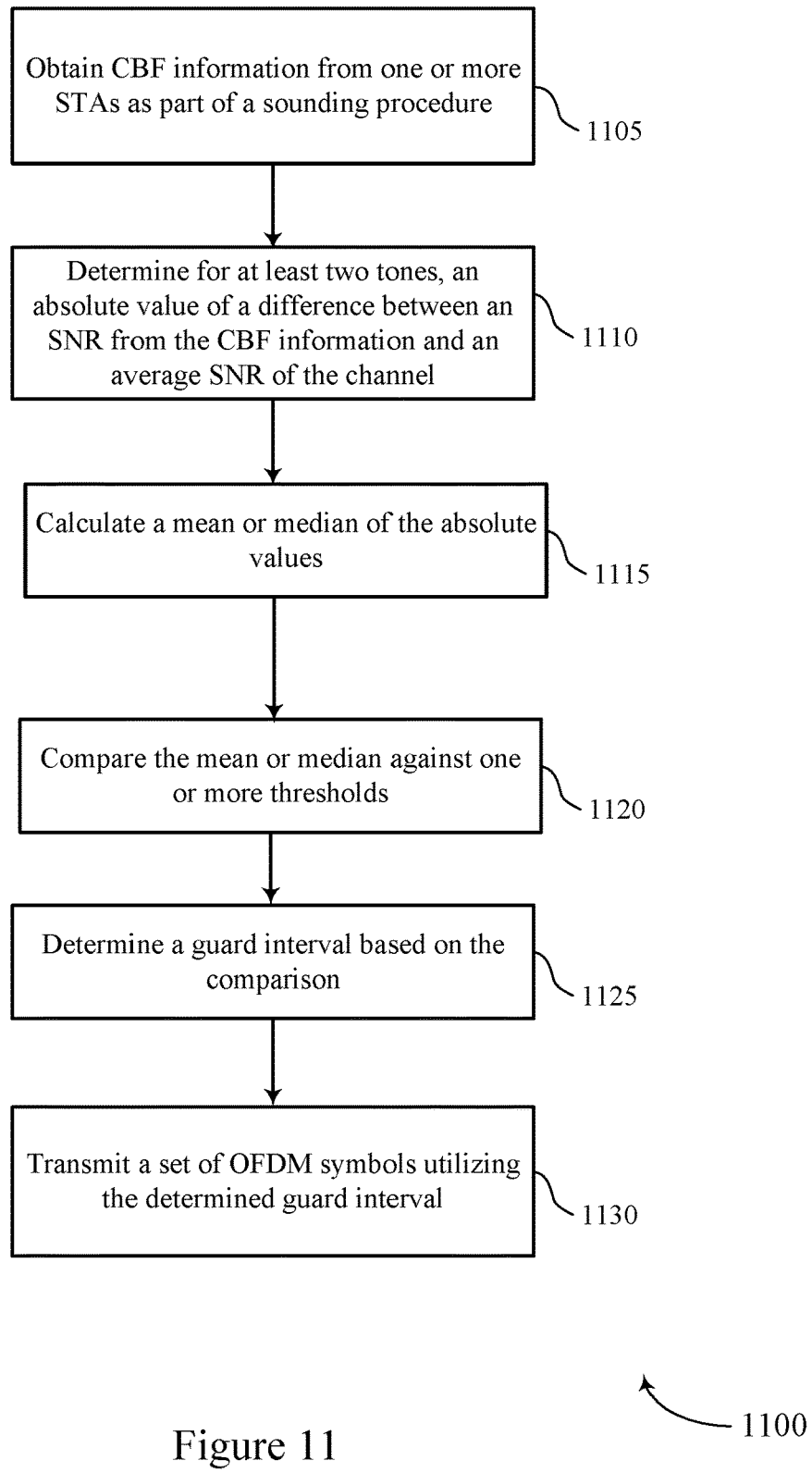

FIG. 11 shows an example method for guard interval selection using compressed beamforming information. The operations of the method 1100 may be implemented by an AP 105 or its components as described herein. For example, the operations of the method 1100 may be performed by a guard interval determination manager as described with reference to FIGS. 5-8. In some implementations, an AP 105 may execute a set of codes to control the functional elements of the device to perform the functions described below. Additionally, or alternatively, the AP 105 may perform aspects of the functions described below using special-purpose hardware.

At block 1105 the AP 105 may obtain CBF information from one or more STAs as part of a sounding procedure. The operations of block 1105 may be performed according to the methods described herein. In some implementations, aspects of the operations of block 1105 may be performed by a CBF component as described with reference to FIGS. 5-8.

At block 1110 the AP 105 may select a number of tones from the CBF and then determine for at least two tones, an absolute value of a difference between an SNR from the CBF information and an average SNR of the channel for each of the at least two tones. In some implementations, aspects of the operations of block 1110 may be performed by the selection component 755 and the absolute value component 750 as described with reference to FIG. 7.

At block 1115 the AP 105 may calculate a mean or median of the absolute values for the at least two tones. In some implementations, aspects of the operations of block 1115 may be performed by the absolute value component 750 as described with reference to FIG. 7.

At block 1120 the AP 105 may compare the mean or median against one or more thresholds. The AP 105 may implement multiple thresholds that correspond to various guard intervals. Using the 802.11ax specification as an example, if the mean or median is below a first threshold, the AP 105 may utilize the 800 ns guard interval in its transmissions. If the mean or median is greater than the first threshold but less than a second threshold, the AP 105 may utilize the 1.6 µs guard interval in its transmissions. If the mean or median is greater than the second threshold, the AP 105 may utilize the 3.2 µs guard interval in its transmissions. In some implementations, aspects of the operations of block 1120 may be performed by the guard interval determination manager as described with reference to FIGS. 5-8.

At block 1125 the AP 105 may determine a guard interval based on the comparison in block 1120. The operations of block 1125 may be performed according to the methods described herein. In some implementations, aspects of the operations of block 1125 may be performed by the guard interval determination manager as described with reference to FIGS. 5-8.

At block 1130 the AP 105 may transmit a plurality of OFDM symbols utilizing the determined guard interval. The operations of block 1130 may be performed according to the methods described herein. In some implementations, aspects of the operations of block 1130 may be performed by a transmitter as described with reference to FIGS. 5-8.

Figure 12:
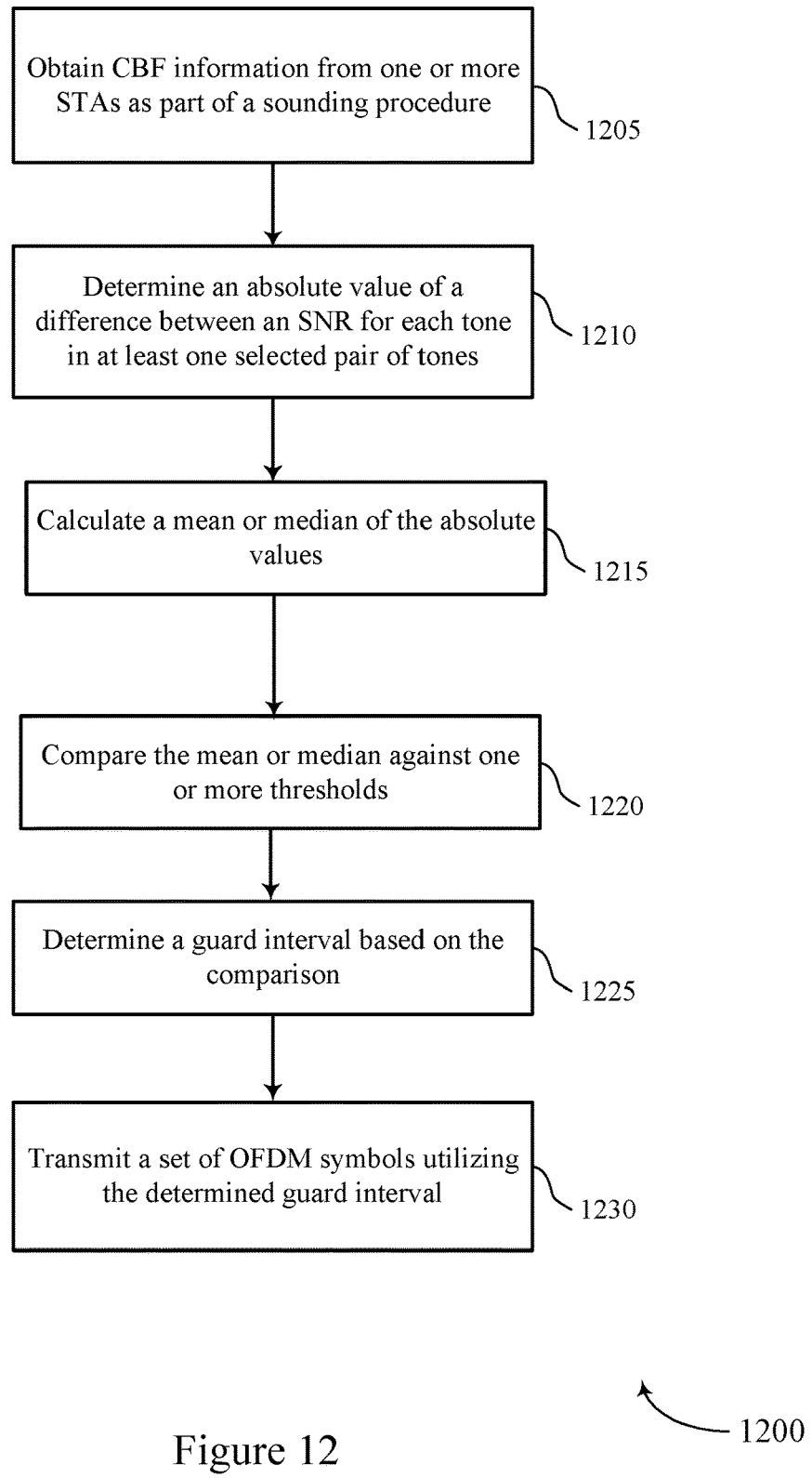

FIG. 12 shows an example method for guard interval selection using compressed beamforming information. The operations of the method 1200 may be implemented by an AP 105 or its components as described herein. For example, the operations of the method 1200 may be performed by a guard interval determination manager as described with reference to FIGS. 5-8. In some implementations, an AP 105 may execute a set of codes to control the functional elements of the device to perform the functions described below. Additionally, or alternatively, the AP 105 may perform aspects of the functions described below using special-purpose hardware.

At block 1205 the AP 105 may obtain CBF information from one or more STAs as part of a sounding procedure. The operations of block 1205 may be performed according to the methods described herein. In some implementations, aspects of the operations of block 1205 may be performed by a CBF component as described with reference to FIGS. 5-8.

At block 1210 the AP 105 may select one or more pairs of tones from the CBF and then determine an absolute value of a difference between an SNR for each tone in one or more selected pairs of tones. In some implementations, aspects of the operations of block 1210 may be performed by the selection component 755 and the absolute value component 750 as described with reference to FIG. 7.

At block 1215 the AP 105 may calculate a mean or median of the absolute values for the one or more selected pairs of tones. In some implementations, aspects of the operations of block 1215 may be performed by the absolute value component 750 as described with reference to FIG. 7.

At block 1220 the AP 105 may compare the mean or median against one or more thresholds. The AP 105 may implement multiple thresholds that correspond to various guard intervals. Using the 802.11ax specification as an example, if the mean or median is below a first threshold, the AP 105 may utilize the 800 ns guard interval in its transmissions. If the mean or median is greater than the first threshold but less than a second threshold, the AP 105 may utilize the 1.6 µs guard interval in its transmissions. If the mean or median is greater than the second threshold, the AP 105 may utilize the 3.2 µs guard interval in its transmissions. In some implementations, aspects of the operations of block 1220 may be performed by the guard interval determination manager as described with reference to FIGS. 5-8.

At block 1225 the AP 105 may determine a guard interval based on the comparison in block 1220. The operations of block 1225 may be performed according to the methods described herein. In some implementations, aspects of the operations of block 1225 may be performed by the guard interval determination manager as described with reference to FIGS. 5-8.

At block 1230 the AP 105 may transmit a plurality of OFDM symbols utilizing the determined guard interval. The operations of block 1230 may be performed according to the methods described herein. In some implementations, aspects of the operations of block 1230 may be performed by a transmitter as described with reference to FIGS. 5-8.

Figure 13:
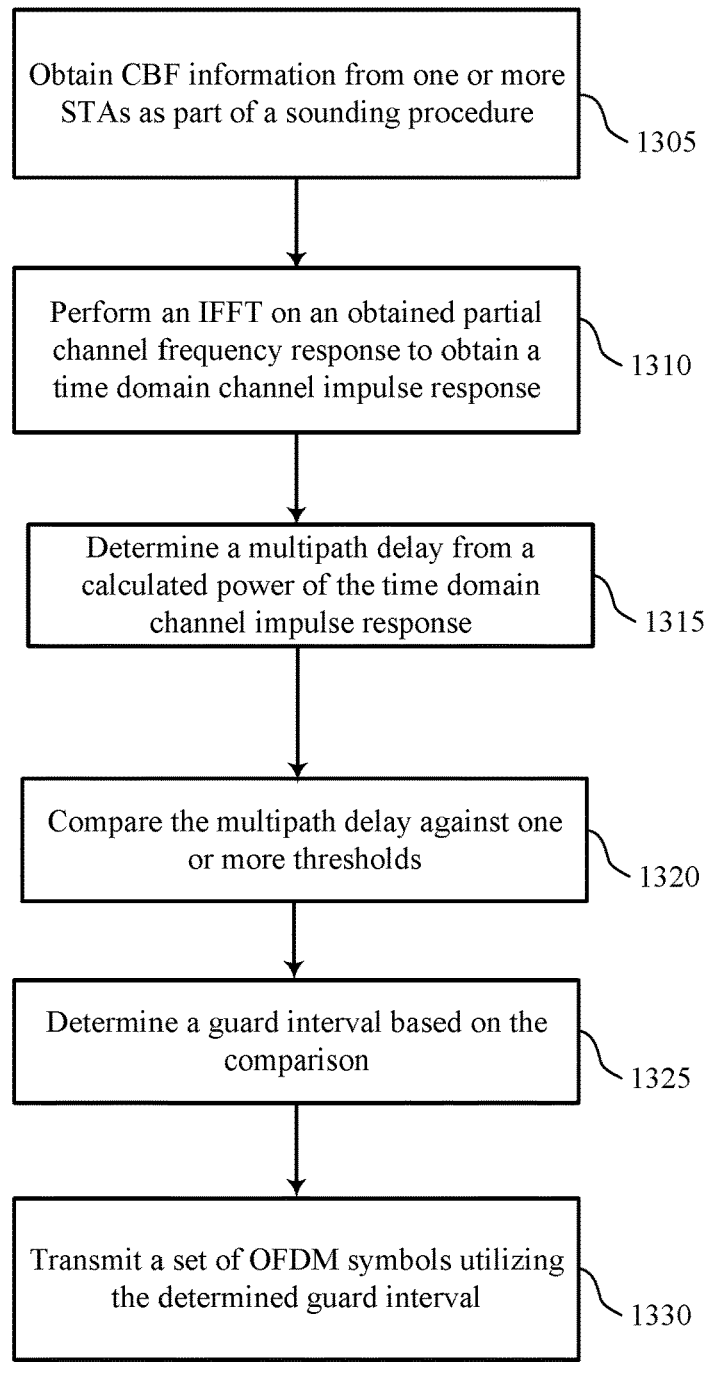

FIG. 13 shows an example method for guard interval selection using compressed beamforming information. The operations of the method 1300 may be implemented by an AP 105 or its components as described herein. For example, the operations of the method 1300 may be performed by a guard interval determination manager as described with reference to FIGS. 5-8. In some implementations, an AP 105 may execute a set of codes to control the functional elements of the device to perform the functions described below. Additionally, or alternatively, the AP 105 may perform aspects of the functions described below using special-purpose hardware.

At block 1305 the AP 105 may obtain CBF information from one or more STAs as part of a sounding procedure. The operations of block 1305 may be performed according to the methods described herein. In some implementations, aspects of the operations of block 1305 may be performed by a CBF component as described with reference to FIGS. 5-8.

At block 1310 the AP 105 may obtain a compressed beamforming matrix and an SNR matrix from the CBF information. The SNR matrix may include one or more values of the per-tone SNR information. In a single-user transmit beamforming case, the SNR matrix may include one or more average SNR values. With the obtained compressed beamforming matrix and an SNR matrix, the AP 105 may determine a partial channel frequency response. The AP 105 may perform an IFFT on the partial channel frequency response to obtain a time domain channel impulse response. In some implementations, aspects of the operations of block 1310 may be performed by the channel response component 760 as described with reference to FIG. 7.

At block 1315 the AP 105 may calculate a power of the time domain channel impulse response. The power may be a peak power, a noise power, or other power characteristics of the time domain channel impulse response. The AP 105 may use the peak power, the noise power, or a combination of the two to determine a channel impulse response power threshold. The AP 105 may utilize the channel impulse response power threshold to determine a first received impulse response and a last received impulse response. From the first received impulse response and a last received impulse response, the AP 105 may determine a multipath delay for the channel. In some implementations, aspects of the operations of block 1315 may be performed by the channel response component 760 as described with reference to FIG. 7.

At block 1320 the AP 105 may compare the multipath delay against one or more thresholds. The AP 105 may implement multiple thresholds that correspond to various guard intervals. Using the 802.11ax specification as an example, if the multipath delay is below a first threshold, the AP 105 may utilize the 800 ns guard interval in its transmissions. If the multipath delay is greater than the first threshold but less than a second threshold, the AP 105 may utilize the 1.6 µs guard interval in its transmissions. If the multipath delay is greater than the second threshold, the AP 105 may utilize the 3.2 µs guard interval in its transmissions. In some implementations, aspects of the operations of block 1320 may be performed by the guard interval determination manager as described with reference to FIGS. 5-8.

At block 1325 the AP 105 may determine a guard interval based on the comparison in block 1320. The operations of block 1325 may be performed according to the methods described herein. In some implementations, aspects of the operations of block 1325 may be performed by the guard interval determination manager as described with reference to FIGS. 5-8.

At block 1330 the AP 105 may transmit a plurality of OFDM symbols utilizing the determined guard interval. The operations of block 1330 may be performed according to the methods described herein. In some implementations, aspects of the operations of block 1330 may be performed by a transmitter as described with reference to FIGS. 5-8.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
   a processor;
   memory in electronic communication with the processor; and
   instructions stored in the memory and operable, when executed by the processor, to cause the apparatus to:
      obtain compressed beamforming (CBF) information from one or more stations (STAs) as part of a sounding procedure, the CBF information comprising signal-to-noise ratio (SNR) information for a channel;
      obtain, based at least in part on the compressed beamforming information, an indication of frequency variation within a per-tone SNR information using a fast Fourier transform (FFT) of the per-tone SNR information;
      determine a delay spread based on the indication of frequency variation within the per-tone SNR information;
      determine a guard interval (GI) based at least in part on the determined delay spread; and
      transmit a plurality of orthogonal frequency-division multiplexing (OFDM) symbols utilizing the determined GI.

2. The apparatus of claim 1, wherein the instructions are further executable by the processor to:
   compare the determined delay spread against one or more thresholds;
   wherein the GI is determined based at least in part on the comparison.

3. The apparatus of claim 1, wherein the instructions are further executable by the processor to:
   determine for at least two tones, an absolute value of a difference between an SNR from the CBF information and an average SNR of the channel for each of the at least two tones; and
   calculate a mean or median of the absolute values for the at least two tones.

4. The apparatus of claim 3, wherein the instructions are further executable by the processor to:
   compare the calculated mean or median against one or more thresholds;
   wherein the GI is determined based at least in part on the comparison.

5. The apparatus of claim 1, wherein the instructions are further executable by the processor to:
   select at least one pair of tones from the CBF information;
   determine an absolute value of a difference between an SNR for each tone in the at least one selected pair of tones; and
   calculate a mean or median of the absolute values for the at least one selected pair of tones.

6. The apparatus of claim 5, wherein the instructions are further executable by the processor to:
   compare the calculated mean or median against one or more thresholds;
   wherein the GI is determined based at least in part on the comparison.

7. The apparatus of claim 1, wherein the instructions are further executable by the processor to:
   obtain a partial channel frequency response based on a compressed beamforming feedback matrix and an SNR matrix for the channel;
   perform an inverse fast Fourier transform (IFFT) on the obtained partial channel frequency response to obtain a time domain channel impulse response; and
   calculate a power of the time domain channel impulse response.

8. The apparatus of claim 7, wherein the instructions are further executable by the processor to:
   determine a multipath delay of the channel from the calculated power; and
   compare the determined multipath delay against one or more thresholds;
   wherein the GI is determined based at least in part on the comparison.

9. The apparatus of claim 8, wherein the instructions are further executable by the processor to:
   calculate a channel impulse response power threshold to determine a first received impulse response and a last received impulse response based at least in part on a peak power, a noise power, or a combination thereof, of the calculated power;
   wherein the determined multipath delay is based at least in part on the determined first received impulse response and the determined last received impulse response.

10. The apparatus of claim 8, wherein the SNR matrix comprises one or more values of the SNR information.

11. The apparatus of claim 8, wherein the SNR matrix comprises one or more average SNR values.

12. A method for wireless communication, comprising:
obtaining compressed beamforming (CBF) information from one or more stations (STAs) as part of a sounding procedure, the CBF information comprising signal-to-noise ratio (SNR) information for a channel;
obtaining a partial channel frequency response based on a compressed beamforming feedback matrix and an SNR matrix for the channel;
performing an inverse fast Fourier transform (IFFT) on the obtained partial channel frequency response to obtain a time domain channel impulse response;
calculating a power of the time domain channel impulse response;
determining a guard interval (GI) based at least in part on the calculated power of the time domain channel impulse response; and
transmitting a plurality of orthogonal frequency-division multiplexing (OFDM) symbols utilizing the determined GI.

13. The method of claim 12, further comprising:
obtaining an indication of frequency variation within a per-tone SNR information using a fast Fourier transform (FFT) of the per-tone SNR information; and
determining a delay spread based on the indication of frequency variation within the per-tone SNR information.

14. The method of claim 13, further comprising:
comparing the determined delay spread against one or more thresholds;
wherein the GI is determined based at least in part on the comparison.

15. The method of claim 12, further comprising:
determining for at least two tones, an absolute value of a difference between an SNR from the CBF information and an average SNR of the channel for each of the at least two tones; and
calculating a mean or median of the absolute values for the at least two tones.

16. The method of claim 15, further comprising:
comparing the calculated mean or median against one or more thresholds;
wherein the GI is determined based at least in part on the comparison.

17. The method of claim 12, further comprising:
selecting at least one pair of tones from the CBF information;
determining an absolute value of a difference between an SNR for each tone in the at least one selected pair of tones; and
calculating a mean or median of the absolute values for the at least one selected pair of tones.

18. The method of claim 17, further comprising:
comparing the calculated mean or median against one or more thresholds;
wherein the GI is determined based at least in part on the comparison.

19. The method of claim 12, further comprising:
determining a multipath delay of the channel from the calculated power; and
comparing the determined multipath delay against one or more thresholds;
wherein the GI is determined based at least in part on the comparison.

20. The method of claim 19, further comprising:
calculating a channel impulse response power threshold to determine a first received impulse response and a last received impulse response based at least in part on a peak power, a noise power, or a combination thereof, of the calculated power;
wherein the determined multipath delay is based at least in part on the determined first received impulse response and the determined last received impulse response.

21. The method of claim 19, wherein the SNR matrix comprises one or more values of the SNR information.

22. The method of claim 19, wherein the SNR matrix comprises one or more average SNR values.

23. An apparatus for wireless communication, comprising:
means for obtaining compressed beamforming (CBF) information from one or more stations (STAs) as part of a sounding procedure, the CBF information comprising signal-to-noise ratio (SNR) information for a channel;
means for determining for at least two tones, an absolute value of a difference between an SNR from the CBF information and an average SNR of the channel for each of the at least two tones;
means for calculating a mean or median of the absolute values for the at least two tones;
means for comparing the calculated mean or median against one or more thresholds;
means for determining a guard interval (GI) based at least in part on the comparison; and
means for transmitting a plurality of orthogonal frequency-division multiplexing (OFDM) symbols utilizing the determined GI.

24. The apparatus of claim 23, further comprising:
means for obtaining an indication of frequency variation within a per-tone SNR information using a fast Fourier transform (FFT) of the per-tone SNR information; and
means for determining a delay spread based on the indication of frequency variation within the per-tone SNR information; and
means for comparing the determined delay spread against one or more thresholds; and
wherein the GI is determined based at least in part on the comparison.

25. The apparatus of claim 23, further comprising:
means for selecting at least one pair of tones from the CBF information;
means for determining an absolute value of a difference between an SNR for each tone in the at least one selected pair of tones;
means for calculating a mean or median of the absolute values for the at least one selected pair of tones; and
means for comparing the calculated mean or median against one or more thresholds; and
wherein the GI is determined based at least in part on the comparison.

26. The apparatus of claim 23, further comprising:
means for obtaining a partial channel frequency response based on a compressed beamforming feedback matrix and an SNR matrix for the channel;
means for performing an inverse fast Fourier transform (IFFT) on the obtained partial channel frequency response to obtain a time domain channel impulse response;
means for calculating a power of the time domain channel impulse response;

means for determining a multipath delay of the channel from the calculated power; and means for comparing the determined multipath delay against one or more thresholds;

wherein the GI is determined based at least in part on the comparison.

27. The apparatus of claim 26, further comprising:

means for calculating a channel impulse response power threshold to determine a first received impulse response and a last received impulse response based at least in part on a peak power, a noise power, or a combination thereof, of the calculated power;

wherein the determined multipath delay is based at least in part on the determined first received impulse response and the determined last received impulse response.

* * * * *